US012743770B2

(12) United States Patent
Rajanna et al.

(10) Patent No.: US 12,743,770 B2
(45) Date of Patent: Sep. 22, 2026

(54) SEMANTIC IMAGE RETRIEVAL FOR WHOLE SLIDE IMAGES

(71) Applicant: MEMORIAL SLOAN KETTERING CANCER CENTER, New York, NY (US)

(72) Inventors: Arjun Rajanna, New York, NY (US); Thomas Fuchs, New York, NY (US)

(73) Assignee: Memorial Sloan-Kettering Cancer Center, New York, NY (US)

( * ) Notice: Subject to any disclaimer, the term of this patent is extended or adjusted under 35 U.S.C. 154(b) by 461 days.

(21) Appl. No.: 17/637,023

(22) PCT Filed: Aug. 24, 2020

(86) PCT No.: PCT/US2020/047684
§ 371 (c)(1),
(2) Date: Feb. 21, 2022

(87) PCT Pub. No.: WO2021/041342
PCT Pub. Date: Mar. 4, 2021

(65) Prior Publication Data

US 2024/0420316 A1 Dec. 19, 2024

Related U.S. Application Data

(60) Provisional application No. 62/890,824, filed on Aug. 23, 2019.

(51) Int. Cl.
*G06T 7/00* (2017.01)

(52) U.S. Cl.
CPC .. *G06T 7/0012* (2013.01); *G06T 2207/20081* (2013.01); *G06T 2207/30024* (2013.01)

(58) Field of Classification Search
CPC G06N 3/08; G06N 20/00; G06N 3/02; G06N 3/045; G16H 50/70; G16H 30/20;
(Continued)

(56) References Cited

U.S. PATENT DOCUMENTS

| | | | | |
|---|---|---|---|---|
| 8,611,617 B1 * | 12/2013 | Baluja | G06V 10/44 382/224 |
| 10,176,202 B1 * | 1/2019 | Newman | G06F 18/22 |

(Continued)

FOREIGN PATENT DOCUMENTS

| | | | |
|---|---|---|---|
| CN | 109145958 A * | 1/2019 | G06N 3/045 |
| CN | 109800768 A * | 5/2019 | |
| WO | WO-2009017483 A1 * | 2/2009 | G06V 20/695 |

OTHER PUBLICATIONS

Machine translation of CN-109145958-A obtained from Search (Year: 2019).*

(Continued)

*Primary Examiner* — Courtney Joan Nelson
*Assistant Examiner* — Courtney J Windsor
(74) *Attorney, Agent, or Firm* — Bookoff McAndrews, PLLC

(57) ABSTRACT

Presented herein are systems and methods for semantic image retrieval. A computing system may identify a first biomedical image. The computing system may apply an image retrieval model to the first biomedical image. The image retrieval model may have a convolution block having a first plurality of parameters to generate a feature map using the first biomedical image. The first plurality of parameters may be transferred from a preliminary model. The image retrieval model may have an encoder having a second plurality of parameters to generate a first hash code for the first biomedical image based on the feature map. The computing system may select. from the plurality of second biomedical images corresponding to a plurality of second hash codes, a subset of second biomedical images using the first hash code. The computing system may provide the subset of second biomedical images identified using the first biomedical image.

20 Claims, 25 Drawing Sheets

(58) Field of Classification Search
CPC .... G16H 50/20; A61B 5/4842; G06V 10/774; G06V 10/44; G06V 10/56; G06V 10/82; G06V 20/80; G06V 2201/03; G06T 7/0012; G06T 2207/10024; G06T 2207/10056; G06T 2207/20081; G06T 2207/30004; G06T 2207/30024; G06T 7/246; H04N 23/611
See application file for complete search history.

(56) References Cited

U.S. PATENT DOCUMENTS

| | | | | |
|---|---|---|---|---|
| 2007/0217676 | A1* | 9/2007 | Grauman | G06V 10/764<br>382/190 |
| 2016/0228034 | A1 | 8/2016 | Gluncic | |
| 2018/0137155 | A1 | 5/2018 | Majumdar | |

OTHER PUBLICATIONS

K. G. Dizaji, F. Zheng, N. S. Nourabadi, Y. Yang, C. Deng and H. Huang, "Unsupervised Deep Generative Adversarial Hashing Network," 2018 IEEE/CVF Conference on Computer Vision and Pattern Recognition, Salt Lake City, UT, USA, 2018, pp. 3664-3673, doi: 10.1109/CVPR.2018.00386. (Year: 2018).*
Machine translation obtained from google patents CN-109800768-A (Year: 2019).*
International Search Report and Written Opinion of the International Searching Authority issued in PCT Application No. PCT/US2020/047684, mailed Nov. 20, 2020.

* cited by examiner

Grade 5

Grade 6

Grade 7

Grade 8

Grade 9

TANH = Image Retrieval Precision Of Prostate TMA

Precision (hamming radius <=2)

0.52
0.5
0.48
0.46
0.44
0.42

10 20 30 40 50 60 70 80 90 100

Of Top Images Retrieved

SEMANTIC IMAGE RETRIEVAL FOR WHOLE SLIDE IMAGES

CROSS-REFERENCE TO RELATED PATENT APPLICATIONS

The present application is a U.S. National Phase Application under 35 U.S.C. § 371 of International Application No. PCT/US2020/047684, filed Aug. 24, 2020, which claims priority to and the benefit of U.S. Provisional Application No. 62/890,824, titled "SEMANTIC CONTENT BASED IMAGE RETRIEVAL," filed on Aug. 23, 2019, the contents of which are incorporated herein by reference in their entirety.

BACKGROUND

A computing device may employ computer vision techniques to compare different images to one another. In comparing the images, the computing device may use any number of factors to perform the evaluation.

SUMMARY

At least one aspect of the present disclosure is directed to systems and methods of training models for semantic image retrieval. A computing system may establish a first model comprising a first plurality of kernel parameters, using a first training dataset having a plurality of unlabeled images. The computing system may identify a second training dataset having a plurality of labeled images. Each of the plurality of labeled images may be associated with one of a plurality of classifications. The computing system may establish a second model using the second training dataset. The second model may have a convolution block having the first plurality of kernel parameters from the first model to generate a feature map using a corresponding labeled image of the plurality of labeled images. The second model may have an encoder having a second plurality of kernel parameters to generate a hash code for the corresponding labeled image based on the feature map. The second model may have a classifier having a third plurality of kernel parameters to generate a classification for the corresponding labeled image based on the hash code. The computing system may determine an error metric based on a comparison between the classification generated by the classifier and a corresponding classification indicated in the second training dataset. The computing system may update the second model using the error metric to set at least one of the first plurality of kernel parameters in the convolution block, the second plurality of kernel parameters of the encoder, or the third plurality of kernel parameters of the classifier. The computing system may store at least one of a plurality of hash codes generated by the second model using the plurality of labeled images of the second training dataset.

In some embodiments, the first model may have a generator comprising a fourth plurality of kernel parameters and a discriminator comprising the first plurality of kernel parameters. In some embodiments, establishing the second model may have transferring the first plurality of kernel parameters from a discriminator of the first model to the convolution block of the second model.

In some embodiments, the encoder of the second model may have a threshold layer having at least a subset of the second plurality of kernel parameters to generate a first discrete value for the hash code when an input value satisfies a threshold and generate a second discrete value for the hash code when the input value does not satisfy the threshold.

In some embodiments, each hash code of the plurality of hash codes has a set of values defining one or more features of the corresponding labeled image. The set of values of the hash code may correspond to at least one of a color, a texture, an object type, and semantic information.

In some embodiments, the plurality of unlabeled images in the first training dataset are of a first domain and the plurality of labeled images in the second training dataset are of a second domain different from the first domain. Each of the plurality of labeled images may be derived from a tissue sample via a histopathological image preparer. The plurality of labeled images in the second training dataset number may be less than the plurality of unlabeled images in the first training dataset.

In some embodiments, the computing system may use at least one of the plurality of hash codes generated by the second model to identify a matching labeled image of the plurality of labeled images.

At least one aspect is directed to systems and methods of semantic image retrieval. A computing system may identify a first biomedical image with which to find at least one of a plurality of second biomedical images. The computing system may apply an image retrieval model to the first biomedical image. The image retrieval model may have a convolution block having a first plurality of kernel parameters to generate a feature map using the first biomedical image. The first plurality of kernel parameters may be transferred from a preliminary model. The image retrieval model may have an encoder having a second plurality of kernel parameters to generate a first hash code for the first biomedical image based on the feature map. The computing system may select, from the plurality of second biomedical images corresponding to a plurality of second hash codes, a subset of second biomedical images using the first hash code for the first biomedical image. The computing system may provide the subset of second biomedical images identified using the first biomedical image.

In some embodiments, selecting the subset of second biomedical images may include generating a distance metric between the first hash code and a corresponding second hash code of the plurality of second hash codes for a corresponding second biomedical image of the plurality of second biomedical images. Selecting the subset of second biomedical images may include determining that the distance metric between the first hash code and corresponding second hash code is within a threshold metric. Selecting the subset of second biomedical images may include including, into the subset of second biomedical images, the second biomedical image corresponding to the second hash code.

In some embodiments, the encoder of the image retrieval model may include a threshold layer having at least a subset of the second plurality of kernel parameters to generate a first discrete value for the hash code when an input value satisfies a threshold and generate a second discrete value for the hash code when the input value does not satisfy the threshold.

In some embodiments, each hash code of the plurality of hash codes has a set of values defining one or more features of the corresponding labeled image. The set of values of the hash code can correspond to at least one of a color, a texture, an object type, and semantic information.

In some embodiments, the convolution block of the image retrieval model may have the first plurality of kernel parameters transferred from the preliminary model. The preliminary model established using a training dataset may have a plurality of unlabeled images different from a plurality of labeled images used to establish the image retrieval model.

In some embodiments, the image retrieval model may lack a classifier used to update at least one of the first plurality of kernel parameters of the convolution block and the second plurality of kernel parameters of the encoder based on a comparison between a classification for a sample biomedical image generated by the classifier and a labeled classifier for the sample biomedical image as identified in a training dataset. In some embodiments, identifying the biomedical image may include receiving the first biomedical image derived from a tissue sample via a histopathological image preparer.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
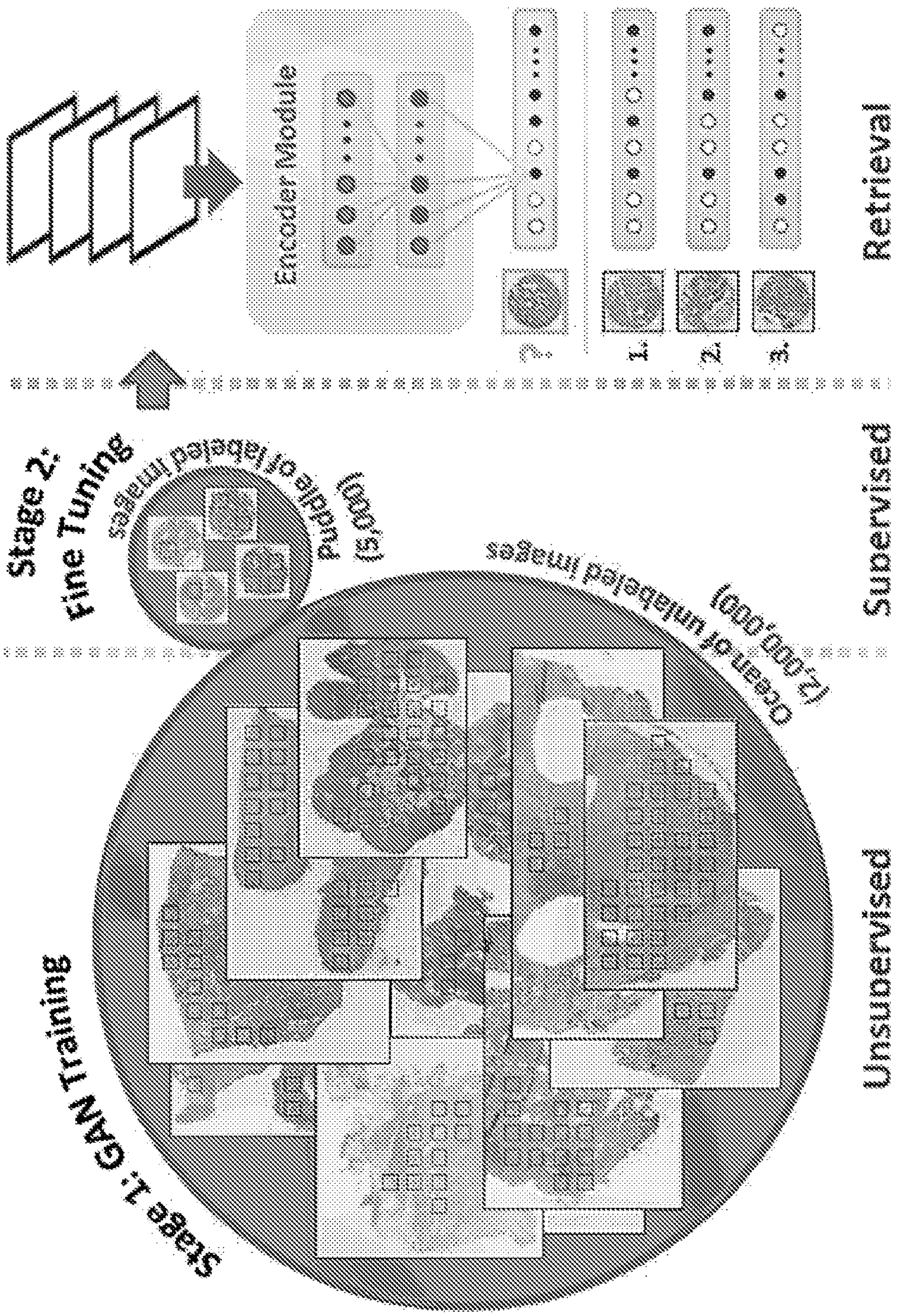
FIG. 1 depicts an embodiment of Semantic Image Retrieval. A first stage can include unsupervised pre-training for Content Based Image Retrieval. A generative model is trained from millions of unlabeled images on one dataset. A second stage can include transferring to a significantly smaller but labeled dataset for fine-tuning compact binary descriptors for image retrieval in a retrieval stage.

Following below are more detailed descriptions of various concepts related to, and embodiments of, systems and methods for semantic image retrieval. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes generative adversarial networks for large-scale semantic image retrieval.

Section B describes systems and methods for semantic image retrieval.

Section C describes a network environment and computing environment which may be useful for practicing various embodiments described herein.

A. GENERATIVE ADVERSARIAL NETWORKS FOR SEMANTIC IMAGE RETRIEVAL

Content Based Image Retrieval (CBIR) is one aspect of computer vision with a broad range of application from image search to large scale retrieval in medical imaging. Convolution Neural Networks (CNNs) can allow shifting from hand-crafting features to automatic learning of image descriptors from data. One challenge for large-scale application of CNN in the medical domain is the absence of labeled data. Unlike classical computer vision benchmarks, clinical pathology includes vast amounts of unlabeled data and only a small set of expensive annotations from highly trained domain experts.

Presented herein is a two-stage deep learning framework for semantic image retrieval. The first stage can include training a Generative Adversarial Network (GAN) on a huge unlabeled corpus of images. The second stage can include transferring this unsupervised generative model to a small dataset with expert annotations, fine-tuning the GAN model, and encoding the data as compact binary descriptors for fast image retrieval.

The two-stage deep learning framework was tested on a MNIST dataset and a CIFAR10 dataset. The two-stage deep learning framework had significantly accurate performance for 24, 32, and 48-bit descriptors. In addition, the two-stage deep learning framework presents a benchmark dataset for prostate cancer comprising a corpus of 2 million unlabeled training images and 460 thousand test images with curated expert annotations. Finally, the two-stage deep learning framework can be used for image retrieval in pathology.

1. Introduction

1.1. Content Based Image Retrieval

Content Based Image Retrieval (CBIR) can include searching for similar images, rather than query text, in a dataset based on a query image and its content. While CBIR can be applied by search engines or for product matching on cell phones, its widespread use in medicine can be hindered by a lack of training data and expert annotations. Pathology is of particular interest for the computer vision community since modern, digitized pathology departments generate image data at a near petabyte scale. Unfortunately, the vast majority of this data is not annotated at the image level. In contrast to classical computer vision benchmarks that can rely on layman annotators, the annotations in medicine have to come from domain experts with decades of training. Although there have been image retrieval in histopathology, gathering image based labels at scale can be cumbersome and expensive.

Some CBIR embodiments are driven by deep learning approaches such as Convolution Neural Networks (CNNs). Some CBIR systems have used hand-crafted image descriptors, while others use learning based hashing methods, which learn a similarity-preserving hash function that encodes similar images with similar compact binary codes. Some systems are unsupervised while others are small supervised models. Unsupervised models require training, and while several large scale unlabeled datasets like Tiny-Images are available, there are obstacles to their use because of the difficulty of training RBMs by fine-tuning a plethora of hyper-parameters. In auto-encoder based CBIR pipelines, the unsupervised feature learning can precede learning to hash in an unsupervised fashion. In this fine-tuning stage, the reconstruction error of the original image can back-propagate, which can be referenced as unsupervised hashing. Supervised models can use various proxies for similarity/dissimilarity like image categories or image triplets to provide additional performance relative to unsupervised counterparts ranging from PCA, ICA and Restricted Boltzmann Machine to auto-encoders. The medical domain can also include a small dataset with expert labels for fine-tuning of a pre-trained model.

One approach in unsupervised pre-training for CBIR is a two stage framework, where the hash codes are learned first, followed by a joint learning of hash functions and image feature representations. Accordingly, there are two models: CNNH trained without labels and DNNH trained in a supervised fashion. Another approach proposes a single stage method that jointly learns hash codes with image representations in the same environment.

Presented herein is a two-stage deep learning framework having two datasets, one with millions of unlabeled images and a second dataset with a few thousand labeled images. In particular, two-stage deep learning framework can include the transfer of models trained in an unsupervised fashion on one dataset to a second dataset for fine-tuning with a small number of annotated images. The two-stage deep learning framework can query image data generated at modern pathology departments. A hybrid approach comprising unsupervised models and supervised models can use unlabeled data. The embodiments presented herein can include a two stage framework comprising a first stage for learning image features in an unsupervised way, followed by a second stage comprising supervised hash functions and code learning along with image representations in the same environment.

Now referring to FIG. 1, depicted is an embodiment of semantic image retrieval. A first stage can include unsupervised pre-training for content based image retrieval. A generative model is trained from millions of unlabeled images on one dataset. A second stage can include transferring to a significantly smaller but labeled dataset for fine-tuning compact binary descriptors for image retrieval in a retrieval stage.

Figure 2:
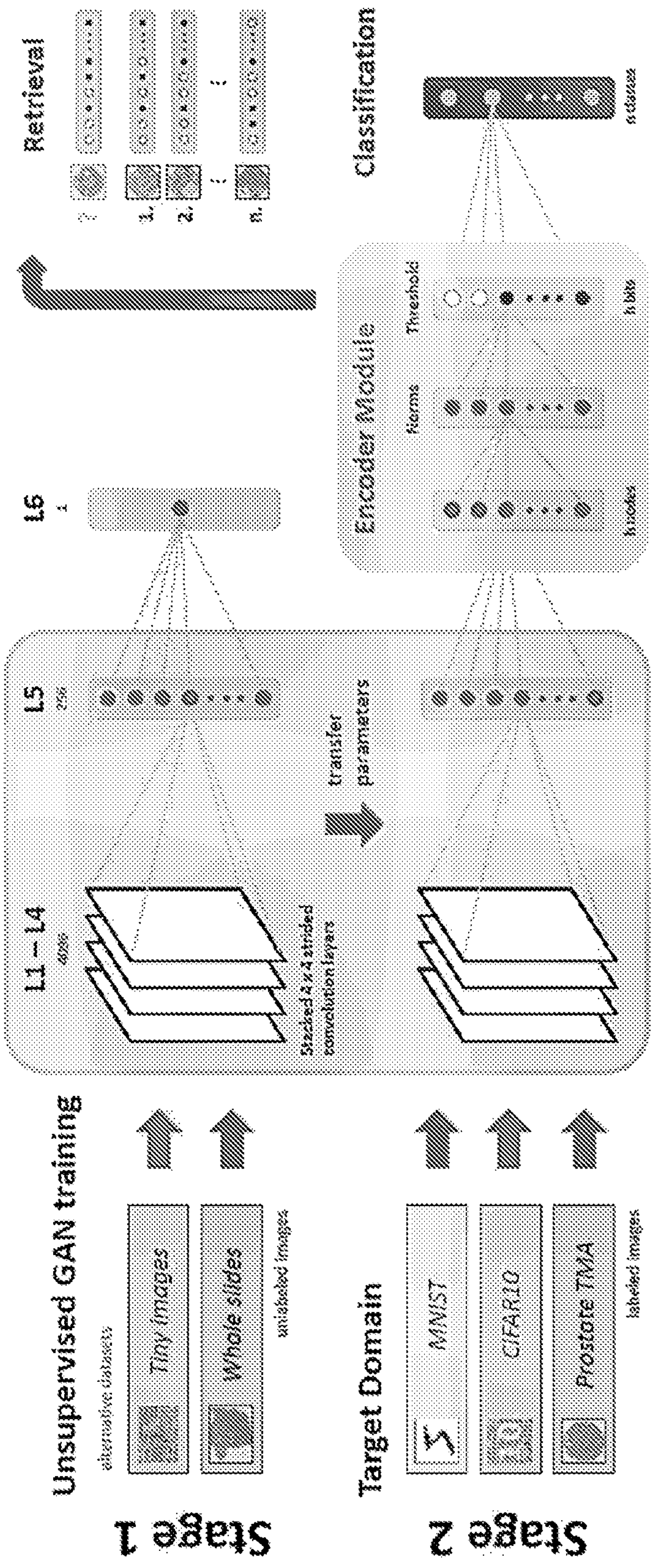
FIG. 2 depicts an illustration of a two stage framework. Stage 1 can include unsupervised pre-training using a Generative Adversarial Network (GAN). Stage 2 can include supervised fine-tuning for learning compact hash representations. The encoder-module can represent images and hash codes. The hash codes can be generated by the threshold layer. The images and hash codes can be stacked on top of the pre-trained GAN in stage 1.

Now referring to FIG. 2, depicted is a two stage framework. Stage 1 can include unsupervised pre-training using a Generative Adversarial Network (GAN). Stage 2 can include supervised fine-tuning for learning compact hash representations. The encoder-module can represent images and hash codes. The hash codes can be generated by the threshold layer. The images and hash codes can be stacked on top of the pre-trained GAN in stage 1.

The embodiments presented herein can be based on semantic hashing utilizing a deep generative model in the form of a restricted Boltzmann machine (RBM) for unsupervised feature learning as a pre cursor for hashing. Generative Adversarial Networks (GANs), a family of generative multi-layered neural networks, can learn reasonable feature representations in an unsupervised fashion such as in multi-class classification tasks on several benchmark datasets. The embodiments presented herein can scale image retrieval to a large magnitude despite the difficulties of unsupervised pre-training in medicine.

1.2. CBIR in Computational Pathology

Prostate cancer is the second most common cancer in men and the fourth most common tumor type worldwide. About 10% of men with prostate cancer die from their disease in the United States. Nearly 90% of prostate cancers are clinically localized at the time of diagnosis, in this era of prostate-specific antigen (PSA) screening. Localized prostate cancer has a highly variable clinical history many have indolent cancers that are cured with initial therapy or can be safely watched (active surveillance), while a small percentage have biologically aggressive cancer that progresses to metastasis and death from disease. The most widely used of the currently available risk stratification models utilize a combination of clinical and pathological parameters such as Gleason score, PSA level and clinical and pathological staging. However these tools do not adequately predict outcome. Recently described recurrent molecular alterations described in primary prostate cancers, including mutations, DNA copy number changes, rearrangements and gene fusions, may have a role in further risk stratification to potentially help distinguish indolent from aggressive disease.

Accordingly, CBIR in pathology can significantly influence clinical care and cancer research. In a digitized pathology department, a clinician can use CBIR to search for patients with similar tissue morphology and compare their treatment and outcome with the query patient at hand. Complementary, a cancer researcher can find cases with similar genetically triggered growth patterns based on hundreds of thousands of patients.

The embodiments presented herein can include an unsupervised pre-training of CBIR systems and a prostate cancer dataset for use as a benchmark for image retrieval and classification to the CVPR community.

2. Other Approaches

Learning based hashing methods can include supervised methods and unsupervised methods. Supervised hashing methods (e.g. class labels, similar pairs, triplets) learn compact hash codes with the requirement of training labels. For example supervised hashing methods can learn features and hash codes based on specific loss functions for image retrieval. In unsupervised hashing methods, the hashes can be generated without the requirement of training labels. In some approaches, RBMs can be pre-trained in a layer-wise fashion and fine-tuned to minimize the reconstruction error in an auto-encoder for the task of document retrieval. Other approaches can pre-train a stack of RBMs on GIST descriptors and fine-tune on a small labeled set for image retrieval. The auto-encoder can be similar to semantic hashing but for image retrieval. Some approaches improve training of RBMs on raw pixels instead of GIST descriptors for CBIR. But in the DeepBit model, the features are initialized in a supervised fashion by training CNNs on ImageNet followed by learning to hash and image representation in an unsupervised manner. Some approaches performed in a semi-supervised learning scenario and obtained classification results.

The embodiments presented herein can include an unsupervised to supervised transfer learning setup to outperform the supervised to unsupervised approach of DeepBit on CIFAR-10.

The embodiments presented herein can be based on CNNH since both have two stages of learning. However, in CNNH+, the first stage can include the hash codes by decomposing S into H and $H^T$, followed by learning of hash functions with labels provided in the second stage. The embodiments presented herein can include an encoder-module based on DNNH's single stage framework that learns to hash along with image representation hand in hand.

Based on the GAN, the CNN of the present embodiments can be empirically stable during unsupervised learning and determine image classification. The GAN model presented herein can include a stack of convolutional layers.

3. Methods

Section 3 describes the proposed framework in detail, starting with the model definition, elaborating on GAN training, transfer learning, the novel encoder module for binary hash codes and finally their application for image retrieval.

3.1 Model Definition: WANH vs. TANH

The embodiments presented herein can include two different applications of CBIR framework: Within Adversarial Network Hashing (WANH) and Transferred Adversarial Network Hashing (TANH).

WANH can be the transferring of features within a domain. For instance, the datasets in stage 1 (pre-training) and stage 2 (fine-tuning) can originate from the same distribution. By transferring the features within a domain, the features learned in GAN training can adapt to the domain of the target. In some embodiments, modifications to the weights of the new layers can adapt the features to the domain of the target and closer to the global minima for the convergence error. Adapting to the domain of the target can learn hash codes which are discriminative to the labels in the domain. The layers $L_{1-4}$ from the GAN pre-trained discriminator network can be transferred to stage 2, the weights in the layers of the encoder-module can be randomly initialized, and the hashes can be learned by backpropagation.

Figure 3A:
FIG. 3A depicts image samples of GAN models trained on prostate whole slides.
Figure 3B:
FIG. 3B depicts image samples of GAN models trained on the Tiny-Images dataset. The GAN models can learn feature representations of different tissue morphology such as connective tissue or cancerous patches.
Figure 4:
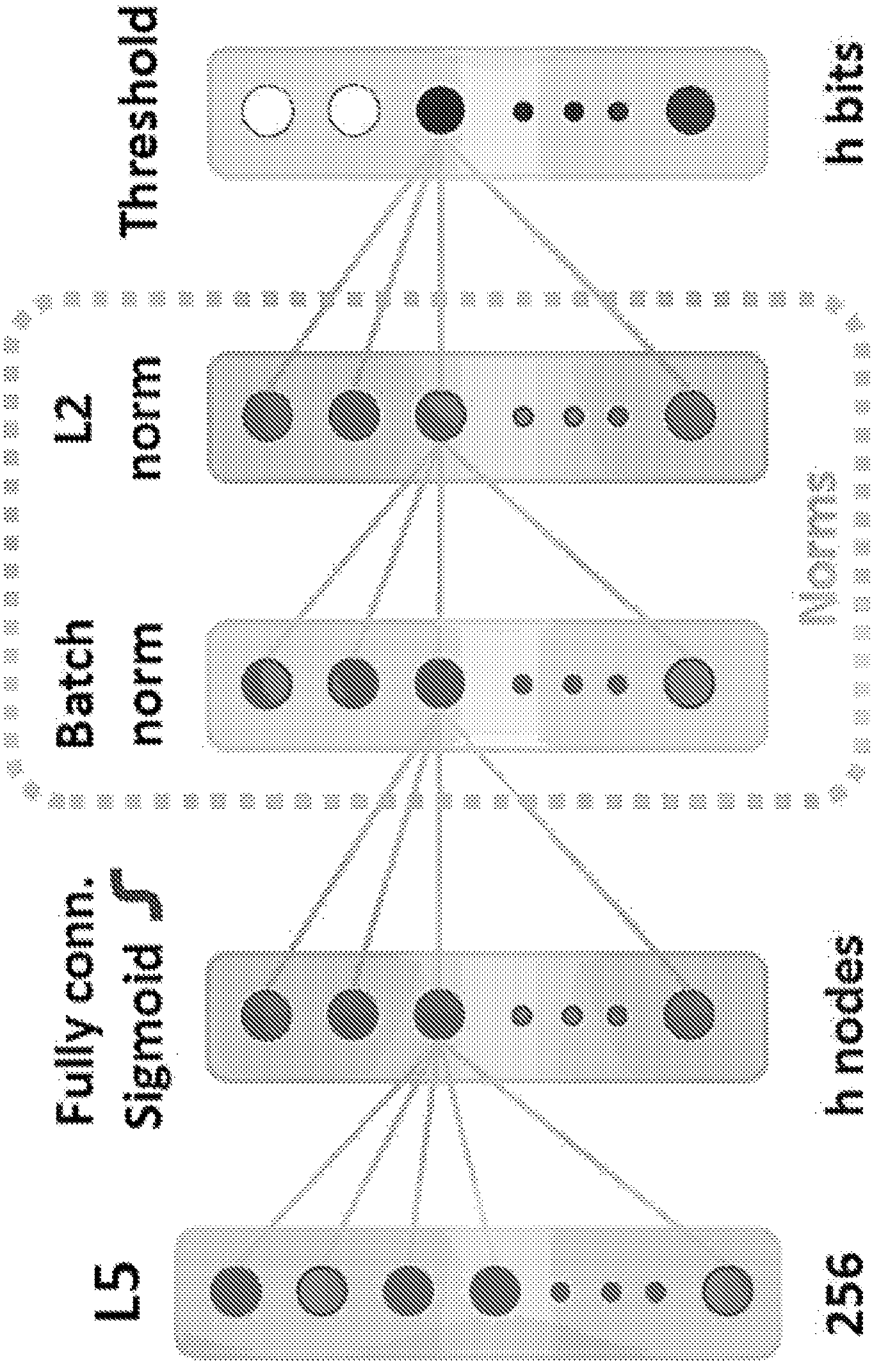
FIG. 4 depicts an encoder module. The encoder module can be stacked on top of the L5 of the pre-trained discriminator network from GAN with h bits being learned for image classification.
Figure 5:
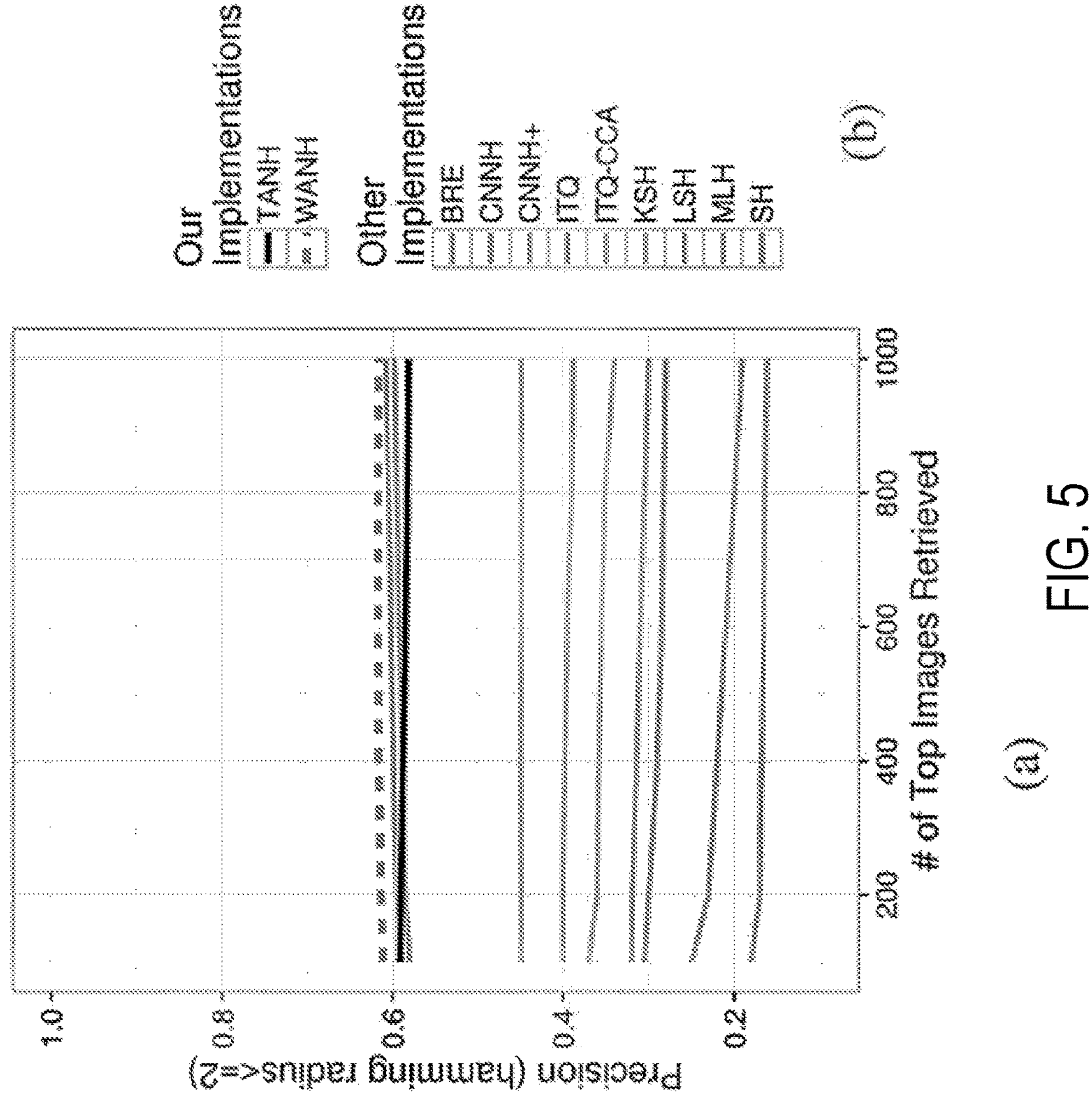
FIG. 5 depicts precision curves within hamming radius 2 for 48-bit CIFAR-10 dataset images.

TANH can include transferring features across domains. A discriminative model can be trained on an outside data distribution and then fine-tuned using target domain data distribution. The outside data distribution in the target domain data distribution can have different data or some overlapping data. The embodiments presented herein can include training the GAN on datasets with overlapping data. For instance, the Tiny images dataset comprises a greater number of labels than ImageNet, so the GAN can train on diverse images. Accordingly, the generator can learn to produce images having distorted content, as similarly depicted in FIG. 3B. In the implementation of TANH, the GAN in stage 1 can be trained on non-target datasets, such as Tiny and Prostate whole slide, and then transfer the features of L5 layer to the fine-tuning phase in stage 2 to learn a compact and yet discriminative set of hash codes with a small set of labeled samples from the target domain dataset.

3.2 Stage 1: Unsupervised Pre-Training

The embodiments presented herein can include unsupervised pre-training for discrimination tasks that include image search. The unsupervised pre-training can be based on GANs, which are a family of generative models based on a mini-max game. GANs can include of two networks, a generator and a discriminator. The generator network, $G(z; \theta^G)$, can produces samples from a random noise distribution vector, z, that goes through G(z) with parameters $\theta^G$. The discriminator network, D(x), can distinguish between the real data distribution, $p_d ata(x)$, and the distribution $p_z(z)$ generated by G(z). The discriminator network can define the loss function of the generator to minimize the log(1−D(z)). The discriminator network can also define the loss function to maximize the probability of correctly classifying between the real and the model generated samples.

Equation 1 depicts the game theory used to train GANs.

$$\min_G \max_D V(D, G) = E_{x \sim P_{data}}[\log D(x)] + E_{z \sim P_z}[\log(1 - D(z))] \quad (1)$$

The architectural design of the generator and the discriminator networks can include fully-connected (fc) layers. The generator G(z) can generate based on a liner transformation of z=100 discrete numbers drawn from a normal distribution as input to the network having that has a series of spatial full-convolution followed by Leaky-ReLU activation functions. In some embodiments, the last layer can instead activate the Tanh. The discriminator D(x) can take inputs from D(z) generated fake distribution and real distribution $p_d ata(x)$. The discriminator D(x) can architecturally include 4 layers of convolution operations of field view 4×4 with a padding 1×1 and stride 2×2 where first layer learns 64 filter maps, and then double the number of filter maps at each succeeding layer with no pooling operation employed, with batch-normalization in each layer, followed by 2 fc layers of [4096 to 256, 256 to 1] with dropout 0.25. Accordingly, the embodiments presented herein can rely on the output fc layer with 256 neurons with learned high level concepts to be transferred to the next stage.

3.3 Stage 2: Fine-Tuning for Hash Code Learning

Some supervised hashing approaches include an availability of labels such as: similar & dissimilar pairs, two similar images with one dissimilar (triplets), or class semantic labels. However, the embodiments presented herein can rely on limited labeled images to learn the efficient image representation and a set of hash functions. As depicted in FIG. 2, Stage 2comprises transferring the learned features from Stage 1, and succeeding them with a network that is fine-tune as the encoder by learning hash codes for multi-class classification. The encoder module can be empirically designed based on a grid search. The encoder module input can be the 256(L5) sigmoid activated neurons from Stage 1 followed by sigmoid activated neurons, batch-normalization, and L-2norm. The output of the L-2norm comprises h, a number of bits to be learned, and neurons and can be a precursor setup to learn gradients for efficient hash codes in the threshold-layer. The threshold layer can be the key within the encoder-module to learn and produce hash codes that can encode semantic similarity in images based on back-propagation to minimize the cross entropy classification error. The gradients can be updated to guide the loss to take steps in the right direction in a stochastic gradient descent setting. In some embodiments, the most discriminative hash codes can be learned when the gradient descent reaches the global minima of the convex optimization curve. In the threshold layer, the threshold can be 0, at which output=1 if x is greater than threshold and the gradients are updated by equation 2

$$\frac{\partial \text{output}}{\partial \text{input}} = \text{value or } \frac{\partial \text{output}}{\partial \text{input}} = 0 \quad (2)$$

wherein value is an incoming discrete number to the neuron.

3.4 Image Retrieval

Once the network is learned based on the two stage framework, the feature vector of each image in the database can be extracted and a query image can then pass through the two stage framework for which the binary descriptors of the image can be computed. The binary descriptors of the image can then be compared with the hash table of 2*h* entries. Matching images can be chosen based on the least distance in hamming space from the feature vector of the image to the binary descriptors of the query image. Each node in the binary descriptor can capturing high level semantics of the image by representing a unique feature of the image such as color, texture, or objects.

4. Experiments

The experiment setup includes datasets, an evaluation metric, and experimental settings. The experimental setup can also include a pathology dataset for image retrieval and classification.

4.1 Experimental Settings

The retrieval experiments are performed on three datasets, (1) MNIST is 28×28 (up sampled to 32×32 to keep our experiments consist as other datasets) grayscale image dataset and consists of 60 k training images with 10 k test images, (2) CIFAR-10 is a 32×32 natural images dataset, consisting of 50 k training images and 10 k test images and (3) Prostate tissue microarray (TMA) dataset, a dataset of 32×32 tiny histopathology color images where there are 400 k training patches and 240 k patches for testing with labels from 5 to 9 representing different Gleason grades of prostate tumor. The breakup of the dataset is as shown in Table 5 (provided in the supplement in Section 6).

The performances of WANH and TANH is compared to four unsupervised methods: Deep-Bit, SH, ITQ, LSH, and six supervised hashing methods that include DNNH, CNNH+, KSH, ITQ-CCA, MLH, and BRE.

In MNIST and CIFAR-10, during stage 1 in WANH, 59900 and 45 k images are used respectively. For the fine-tuning stage, 5000 (500 per class, as used in CNNH+ and DNNH) images (images in GAN training and fine-tuning may overlap) are randomly sampled to learn compact and semantic hash codes, the entire training set is used as the retrieval set. In Prostate TMA, 413, 193 images are used for training the GAN in WANH setting, and 5000 (1000 per class) are used for fine-tuning (Note: samples in GAN training and fine-tuning may overlap) and randomly choose 25 k images (5 k per class) as the retrieval set. The query set is built based on a random selection of 1000 images from the test sets of the datasets.

The Tiny dataset contains approximately 80 million color images down-scaled to a resolution of 32×32 pixels. Approximately 75 k non abstract nouns from the WordNet lexical database can be used as class labels and search terms. The images can be collected from the top 3000 hits from seven search engines, including Google and Flickr. The experiment randomly sampled 2 million images from Tiny.

Prostate Whole Slide (PWS): Microscope slides of 200 prostate cancer patients can be scanned at 20× with the AT2 digital whole slide scanner from Aperio (Leica Biosystems). The whole slide images have an approximate size of 150 k×80 k pixels. The experiments generated an unlabeled prostate cancer dataset by extracting 20 k patches per whole slide using Openslide. Quality control was based on a two-step process: first filtering patches based on pixel intensity and then removing images with less than 90% non-dark<56 and non-overexposed pixels using equation 3:

$$\text{percent} = \frac{N_{pixels}}{T_{pixels}}. \qquad (3)$$

where $N_{pixels}$=number of pixels within the define range and $T_{pixels}$=total number of pixels in an RGB image and perform a grid wise patch extraction of size 256×256, with a stride of 128×128 within the image.

To be comparable to Tiny and CIFAR, these patches can be down-scaled to 32×32 and saved as a png. The experiments empirically set the png size threshold to 2000 bytes and discarded smaller ones. The experiments deliberately matched the dataset size of Tiny by sampling two million prostate cancer patches.

Prostate Tissue Micro Array (TMA): To generate a labeled prostate cancer dataset, the experiments digitized 9 tissue micro arrays for nearly 1000 prostate cancer patients. The experiments conducted the same patch extraction procedure as described above for PWS and again down-scaled the patches of size 256×256 to 32×32 to be comparable to computer vision benchmarks. The experiments also annotated every patch with the Gleason score from its originating patch ranging from Gleason 5 (low grade tumor) to Gleason 9 (high grade tumor). The resulting dataset included 400 k training patches and 240 k patches for testing. The breakup of the dataset is shown in the supplement in Section 6.

The deep learning experiments can be performed using Torch 7 on a computer cluster with Nvidia GTX Titan X (900 series) GPUs with no data augmentation. The experiments can be performed on normalized pixel data.

The parameters of the unsupervised GAN training stage in TANH on Tiny-Images and the prostate whole slides datasets are as follows: the learning rate is 0.0002, along with momentum for the Adam optimizer set to 0.5, with a mini-batch size of 2000, run for 35 epochs. The unsupervised GAN training stage in WANH for MNIST and CIFAR-10, unchanged from that of TANH, but with the extension of training time to 100 epochs due the relatively smaller sized datasets compared to those used in TANH owing to more parameters being tuned.

During the fine-tuning stage for WANH and TANH, the learning rate for the new layers in the encoder module was set to 0.01 as they are learned, with momentum set to 0.9, and a mini-batch size of 1000.

The evaluation metrics reported are mean average precision (mAP), precision curves with varying descriptor bit sizes, and precision with hamming radius 2 curves varying by number of retrieved images.

4.2 Content Based Image Retrieval Results

Empirical results demonstrate the performance of the two-stage deep learning framework described herein relative to other embodiments.

TABLE 1

Quantitative evaluation of competing CBIR systems on MNIST and CIFAR-10. Reported is the mean average precision (mAP) averaged over 1000 queries. While CNNH+ is the leading method on MNIST, the intra domain leaning of an adversarial hashing model (WANH) as well as the unsupervised pre-training and inter domain learning approach (TANH) outperform the other embodiments for 24, 32, and 48-bit on CIFAR-10.

| | MNIST (mAP) | | | | CIFAR-10 (mAP) | | | |
|---|---|---|---|---|---|---|---|---|
| Method | 12-bit | 24-bit | 32-bit | 48-bit | 12-bit | 24-bit | 32-bit | 48-bit |
| WANH (our) | 0.8355 | 0.9656 | 0.9624 | 0.9638 | 0.4390 | 0.5665 | 0.6270 | 0.6197 |
| TANH (our) | 0.9478 | 0.9609 | 0.9561 | 0.9661 | 0.5357 | 0.5862 | 0.5946 | 0.5930 |
| DNNH [19] | — | — | — | — | 0.552 | 0.566 | 0.558 | 0.581 |
| CNNH+ [37] | 0.969 | 0.975 | 0.971 | 0.975 | 0.465 | 0.521 | 0.521 | 0.532 |
| KSH [23] | 0.872 | 0.891 | 0.897 | 0.900 | 0.303 | 0.337 | 0.346 | 0.356 |
| ITQ-CCA [7] | 0.659 | 0.694 | 0.714 | 0.726 | 0.264 | 0.282 | 0.288 | 0.295 |
| MLH [27] | 0.472 | 0.666 | 0.652 | 0.654 | 0.182 | 0.195 | 0.207 | 0.211 |
| BRE [17] | 0.515 | 0.593 | 0.613 | 0.634 | 0.159 | 0.181 | 0.193 | 0.196 |
| DeepBit [21] | — | — | — | — | — | — | 0.2486 | 0.2773 |
| SH [36] | 0.265 | 0.267 | 0.259 | 0.250 | 0.131 | 0.135 | 0.133 | 0.130 |
| ITQ [7] | 0.388 | 0.436 | 0.422 | 0.429 | 0.162 | 0.169 | 0.172 | 0.175 |
| LSH [6] | 0.187 | 0.209 | 0.235 | 0.243 | 0.121 | 0.126 | 0.120 | 0.120 |

| | Prostate TMA | | | |
|---|---|---|---|---|
| Method | 12-bit | 24-bit | 32-bit | 48-bit |
| WANH | 0.1443 | 0.1430 | 0.1391 | 0.1396 |
| TANH | 0.1385 | 0.1452 | 0.1450 | 0.1389 |

Table 2 depicts mAP on Prostate TMA dataset: The performances of WANH and TANH are comparable and independent of bit size

| | MNIST | | | CIFAR-10 | | |
|---|---|---|---|---|---|---|
| Method | 64-bit | 128-bit | 256-bit | 64-bit | 128-bit | 256-bit |
| WANH | 0.9559 | 0.9497 | 0.9696 | 0.6193 | 0.6022 | 0.5939 |
| TANH | 0.9657 | 0.9656 | 0.9717 | 0.6068 | 0.6146 | 0.5941 |

Table 3 depicts mAP on longer hash codes: (a) MNIST: TANH has best results with a 256 bit hash code showing that an increase bit size has a positive effect. (b) CIFAR-10: A degradation in performance can be seen when compared to lower sized bits, however it is not a sharp drop showing that our framework preserves stability even with long hash codes. As shown in Table 1 and 3, the mean average precision (mAP) can be higher than the state-of-the-art with the exception of WANH on CIFAR-10.

TABLE 4

Classification results on CIFAR-10: With feature extraction from GAN and fine-tuning (500 labels per class) the features to reduce test classification error.

| Method | Classification error (%) |
|---|---|
| Exemplar CNN | 22.6% |
| DCGAN + L2-SVM | 26.2% |
| TANH-256-bit | 28.1% |
| TANH-64-bit | 29.67% |
| WANH-32-bit | 29.878% |

In CIFAR-10, WANH shows a relative increase (as shown in Table 1, with DNNH to 6.9%, with CNNH to 3.87%. The benchmark performances are set as shown in Table 3 on Prostate TMA dataset. Restricting the retrieval set size to 25 k can decrease the mAP. In particular, unlike classical computer vision datasets that are finely constructed with little or no noisy images, the datasets used in the experiments described herein included a significant percentage of samples having a high background to foreground ratio, with some samples having an overwhelming majority of background (white pixels). Accordingly, basing the experiments on the entire training set of 400 k as the retrieval set can improve the mAP performance. The mAP can decrease if the hash codes can be learned by minimizing the classification error. Accordingly, carefully choosing the samples for fine-tuning process can increase the classification accuracy to cause learning better hash codes. The mAP can decrease if the images in the 5 class grading scheme are not easily distinguishable even by experts in the field, so the subtle differences result in a challenging classification problem.

4.3 Hash Codes for Classification

Figure 6:
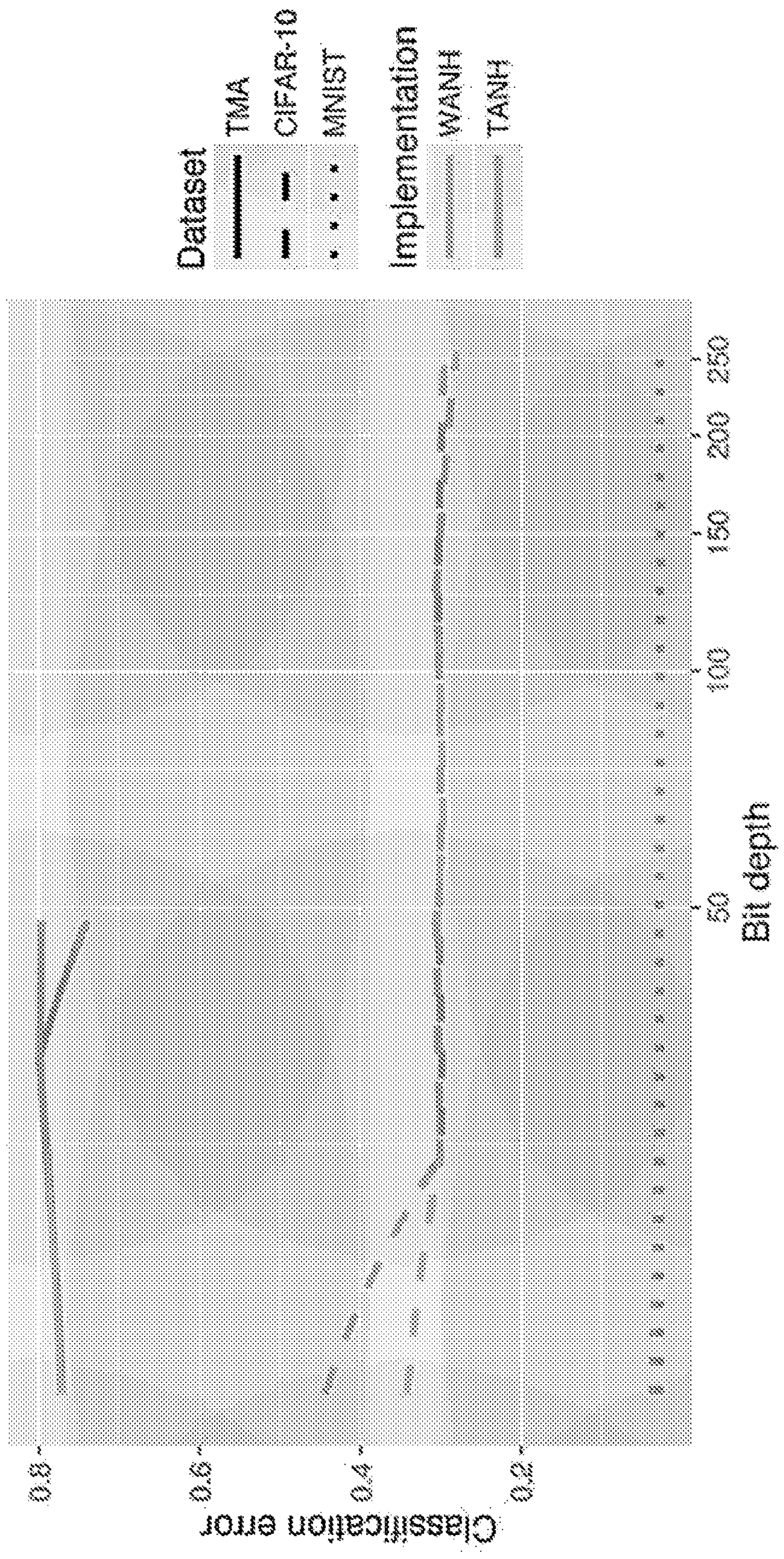
FIG. 6 depicts test errors at different bit depths for CIFAR-10 dataset images, MNIST data set images, and Prostate tissue microarray (TMA) dataset images.

The classification results on CIFAR-10 can be compared with other baselines such as the first two rows of Table 4 based on the unsupervised feature learning. Exemplar CNN can perform with 22.6% error rate with 400 surrogate labels, DCGAN with a 26.2% error with a pre-trained GAN on ImageNet-1k followed by a L2-SVM on top of it with 400 labels provided for fine-tuning the discriminator network to achieve lower error. The last three rows represent results of the bit hashing scheme from the two-stage deep learning framework described herein, TANH-256-bit achieves an error rate of 28.1% based on learned 256-bit hash codes amongst TANH and WANH, and comparable to Exemplar CNN, DCGAN+L2-SVM (which use non-bit codes for classification). The breakup of results as per WANH and TANH for image classification are shown in FIG. 6.

5. Conclusion

The embodiments presented herein implement large-scale unsupervised pre-training for Content Based Image Retrieval. In particular, the two-stage deep learning framework can train a Generative Adversarial Network from millions of unlabeled images on one dataset, then transfer the model for fine-tuning to a different significantly smaller dataset, and use the resulting compact binary descriptors for image retrieval.

The embodiments presented herein include an unsupervised to supervised transfer learning concept for CBIR in scenarios with large amounts of unlabeled data and a small number of expensive expert annotations. The embodiments presented herein can allow Generative Adversarial Networks to be used for unsupervised pre-training for image retrieval. The encoder-module can be used for supervised fine-tuning to facilitate the joint learning of image feature representations and compact binary hash codes. The experiments evaluate the two-stage deep learning framework on CIFAR10 and depict performance relative to other approaches in CBIR for 24, 32 and 48-bit descriptors. The embodiments presented herein also application of large scale CBIR for prostate cancer in Computational Pathology. Finally, the embodiments presented herein present two benchmark datasets for CBIR and classification task in prostate cancer. The first benchmark data set can include 2 million unlabeled patches from whole slides for unsupervised pre-training. The second dataset can be generated from tissue microarrays and comprise 640 k images, each annotated with the Gleason score of the originating case.

The embodiments presented herein can present research into deep generative models for unsupervised pre-training to open up a wide field of applications with dramatic impact in medicine and computer vision in general and pathology in particular. The benchmark prostate datasets can be used for additional benchmarking to apply computer vision techniques to clinical work and cancer research.

6. Supplementary Materials

Prostate Whole Slide (PWS)

Figure 8:
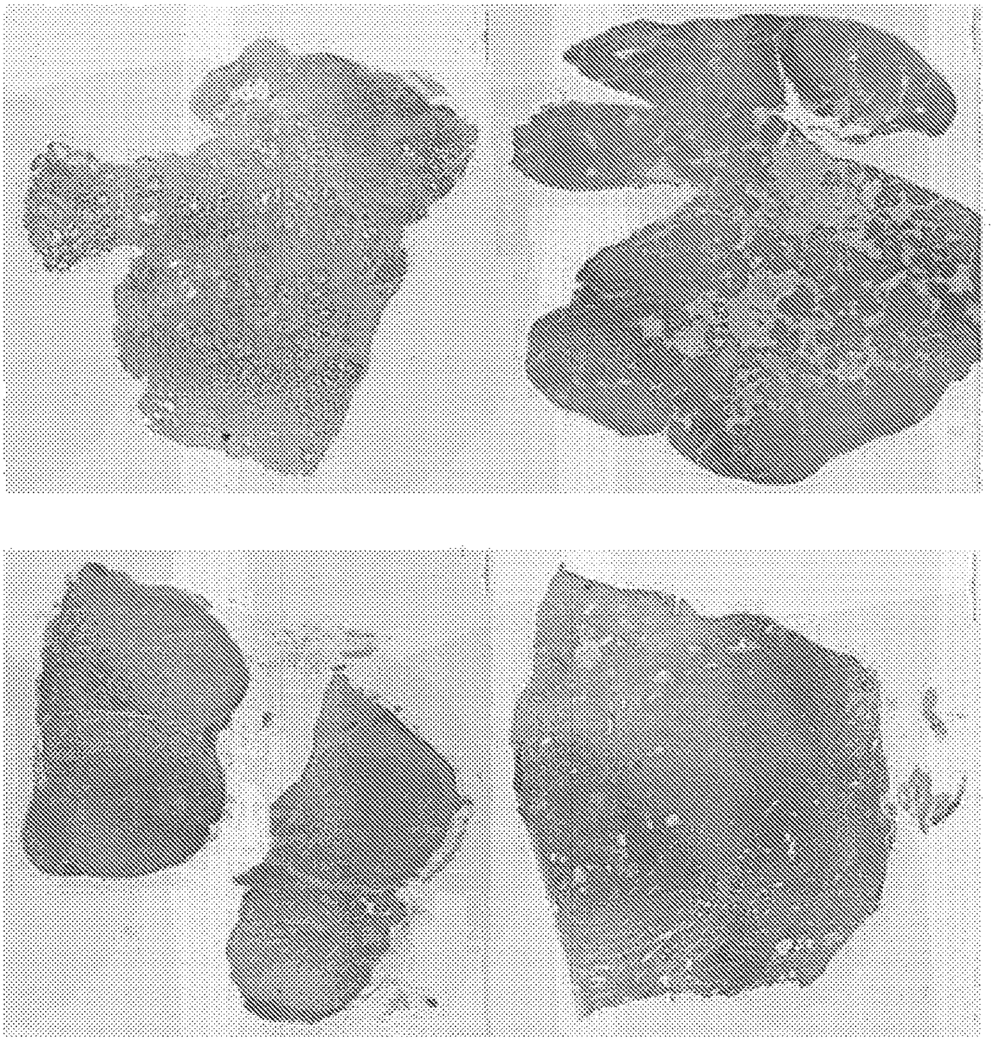
FIG. 8 depicts examples of Prostate Whole slides. Each whole slide can go up to 70 k×40 k pixels in dimensions. The PWS dataset for unsupervised pre-training can be based on grid-wise patch extraction of 256×256 pixels and downscaled to 32×32 pixels.

The Microscope slides are super high dimensional images, which was used to extract patches for unsupervised pre-training (more details mentioned in the sections 1-5). FIG. 8 shows examples of the slide.

Prostate Tissue Micro Array (TMA)

Figure 9:
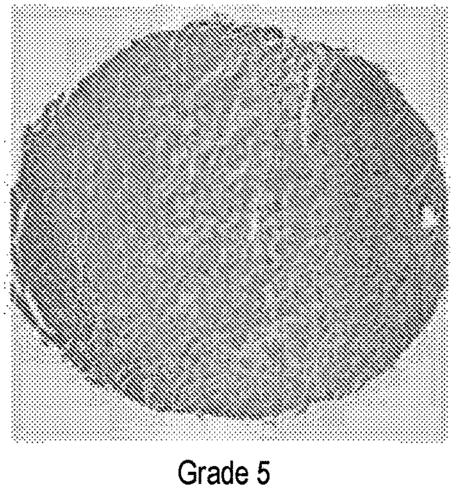
FIG. 9 depicts Examples of Prostate TMA cores. Grade 6 and less can be called "well-differentiated", grade 7 "moderately-differentiated" and above grade 8 (including) "poorly-differentiated".
Figure 9:
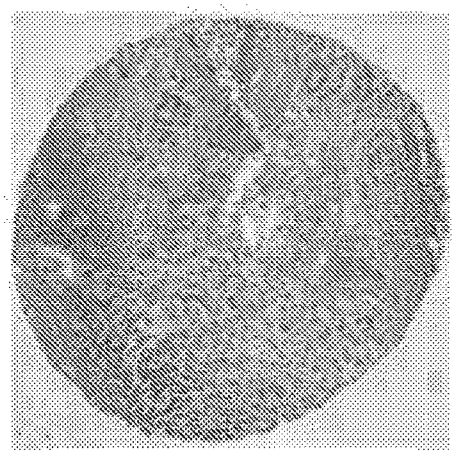
Figure 9:
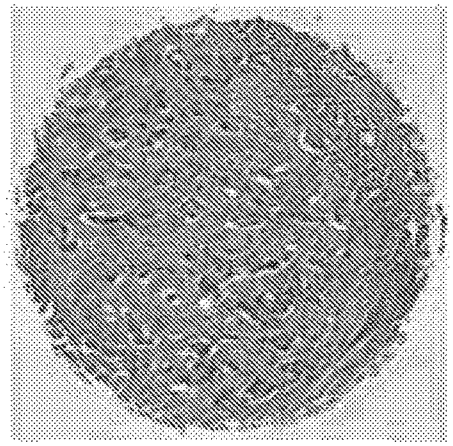
Figure 9:
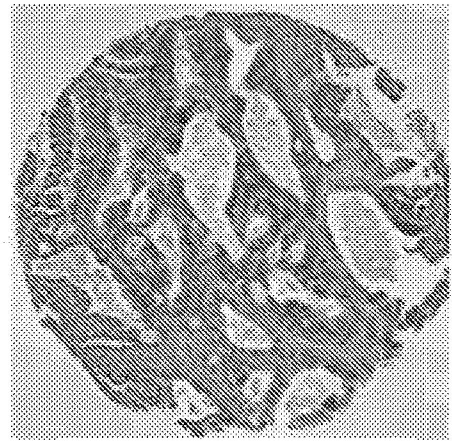
Figure 9:
Figure 10:
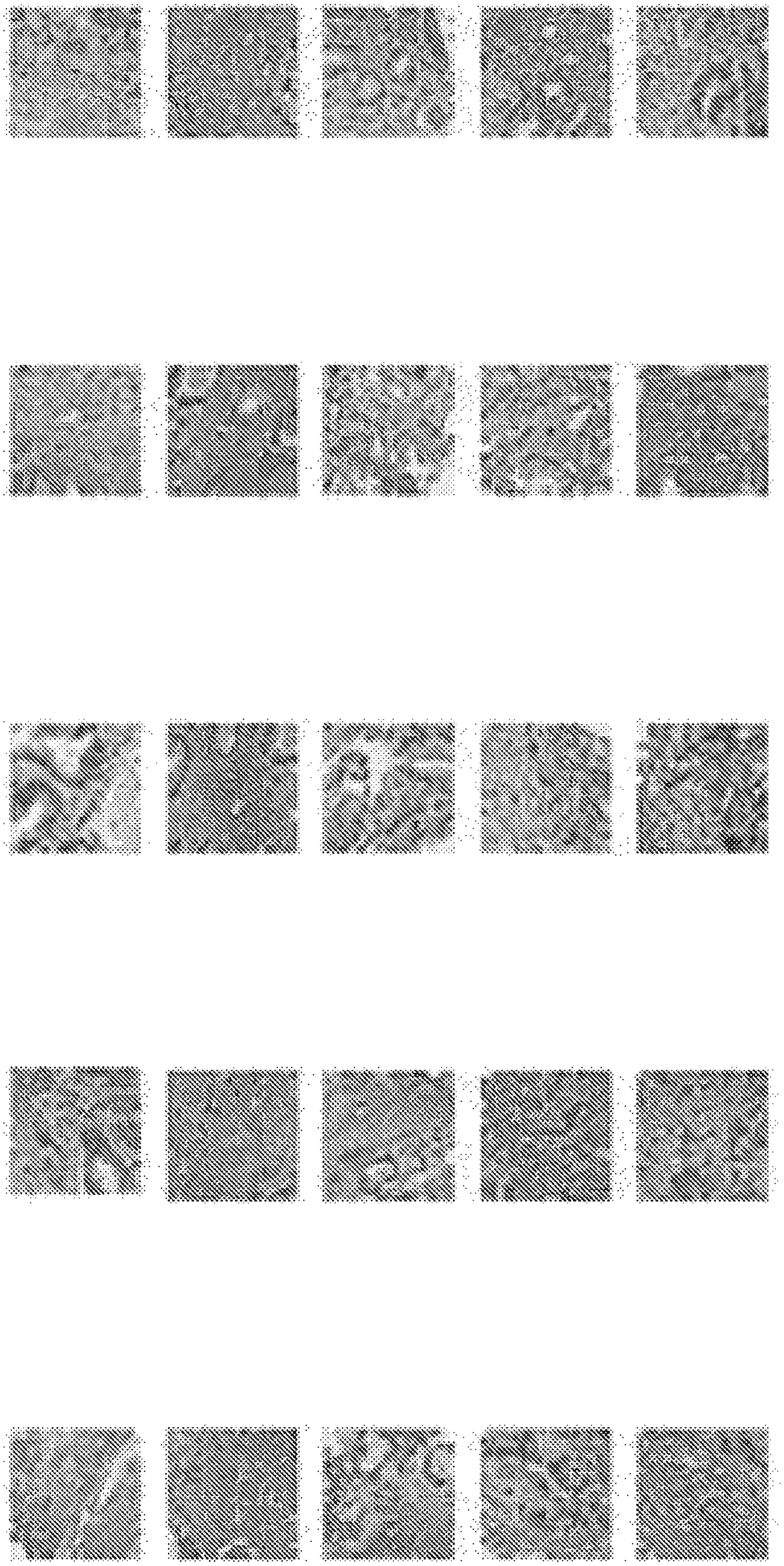
FIG. 10 depicts examples of Prostate TMA patches with various Gleason scores (grades). Row 1 (top): grade 5; row 2: grade 6; row 3: grade 7; row 4: grade 8; row 5: grade 9.

The Prostate TMA dataset consists of five fine-grained classes (grades 5 to 9) or three course grained classes (low (5&6), medium (7) and high (8&9)). FIG. 9 shows examples of a TMA core for each fine-grained class. The patches (FIG. 10) are extracted from many such cores. The statistics of the dataset are given in Table 5.

TABLE 5

Breakup of Prostate TMA dataset: Two class problem - High grade vs. Low grade.

| Gleason grade | Train set Patients | Train set Patches | Test set Patients | Test set Patches |
|---|---|---|---|---|
| 5 (Low) | 34 | 12867 | 35 | 12907 |
| 6 (Low) | 344 | 128633 | 345 | 125189 |
| 7 (Medium) | 609 | 229457 | 608 | 65525 |
| 8 (High) | 64 | 23577 | 64 | 23049 |
| 9 (High) | 51 | 18659 | 52 | 18703 |

TABLE 6 mAP on Prostate TMA dataset: The performances of WANH and TANH are comparable and independent of bit size.

| | Prostate TMA | | | |
|---|---|---|---|---|
| Method | 12-bit | 24-bit | 32-bit | 48-bit |
| WANH | 0.4498 | 0.4586 | 0.4834 | 0.4928 |
| TANH | 0.4714 | 0.4663 | 0.4772 | 0.4767 |

Retrieval Results

Figure 7:
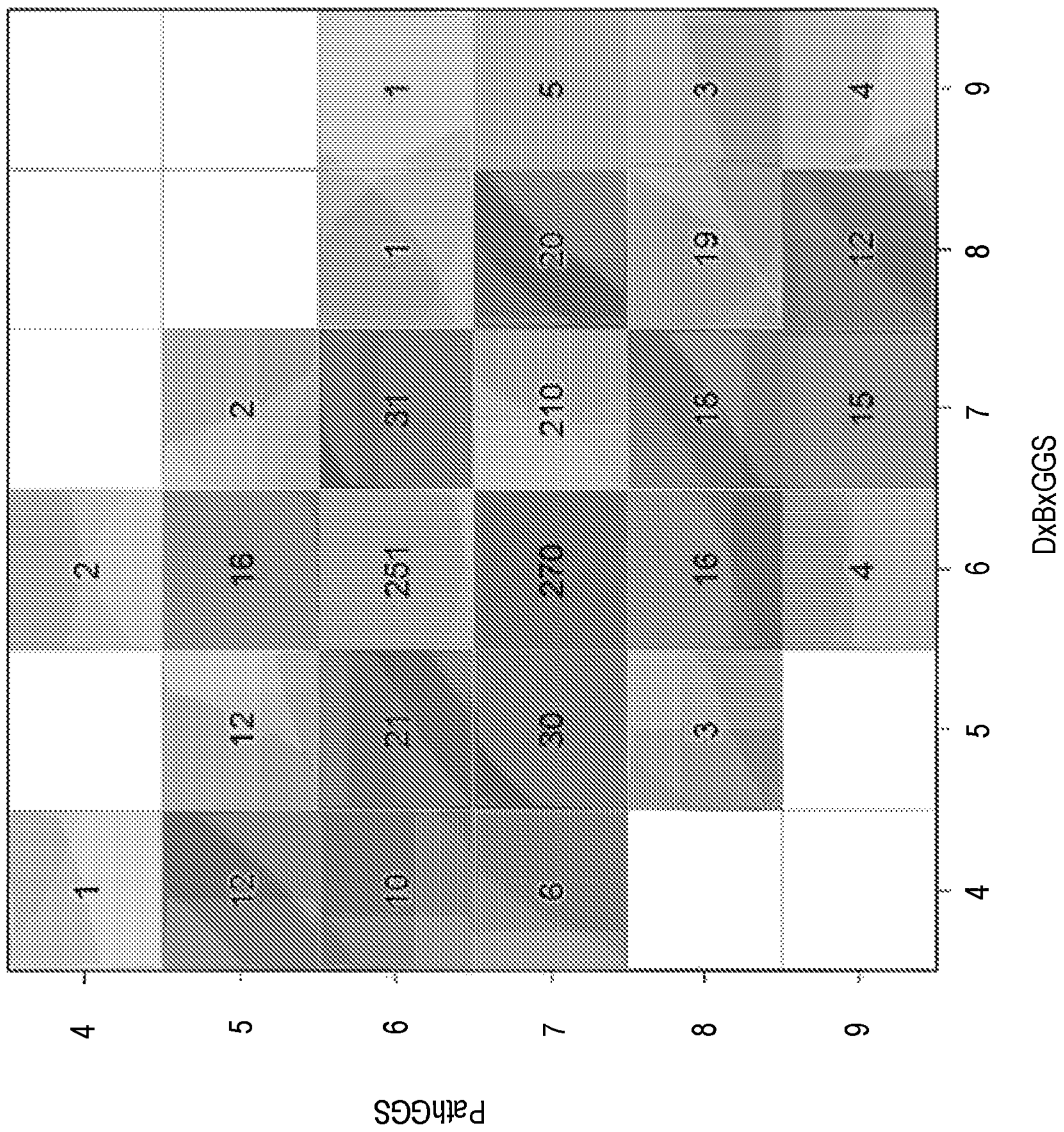
FIG. 7 depicts a standard of pathologists on the entire prostatectomy (PathGGS, y-axis) vs. diagnosis on biopsies (DxBxGGS, x-axis). Shown are the number of patients for each combination. The Gleason score on biopsy can reflect the total Gleason. Gleason 7 is often mixed with 6.

The classification can be re-purposed to a two-class problem (Note: five-class classification results are described in sections 1-5). Gleason grade 7 is not considered due to the high variance in ground truth among expert annotators (c.f. FIG. 7).

500 images can be randomly sampled per class from the training set for Stage 2 to fine-tune the model learned in Stage 1.

As mentioned in the main paper, there can be 1000 query images, and the top 1000 retrieved images can be considered (to calculate our mAP) for evaluation metrics. By freeing the constraints mentioned in section 4.2, 170 k images utilized as the retrieval database and the five-class fine grading scheme can be restricted to a two-class course grading problem.

Figure 11A:
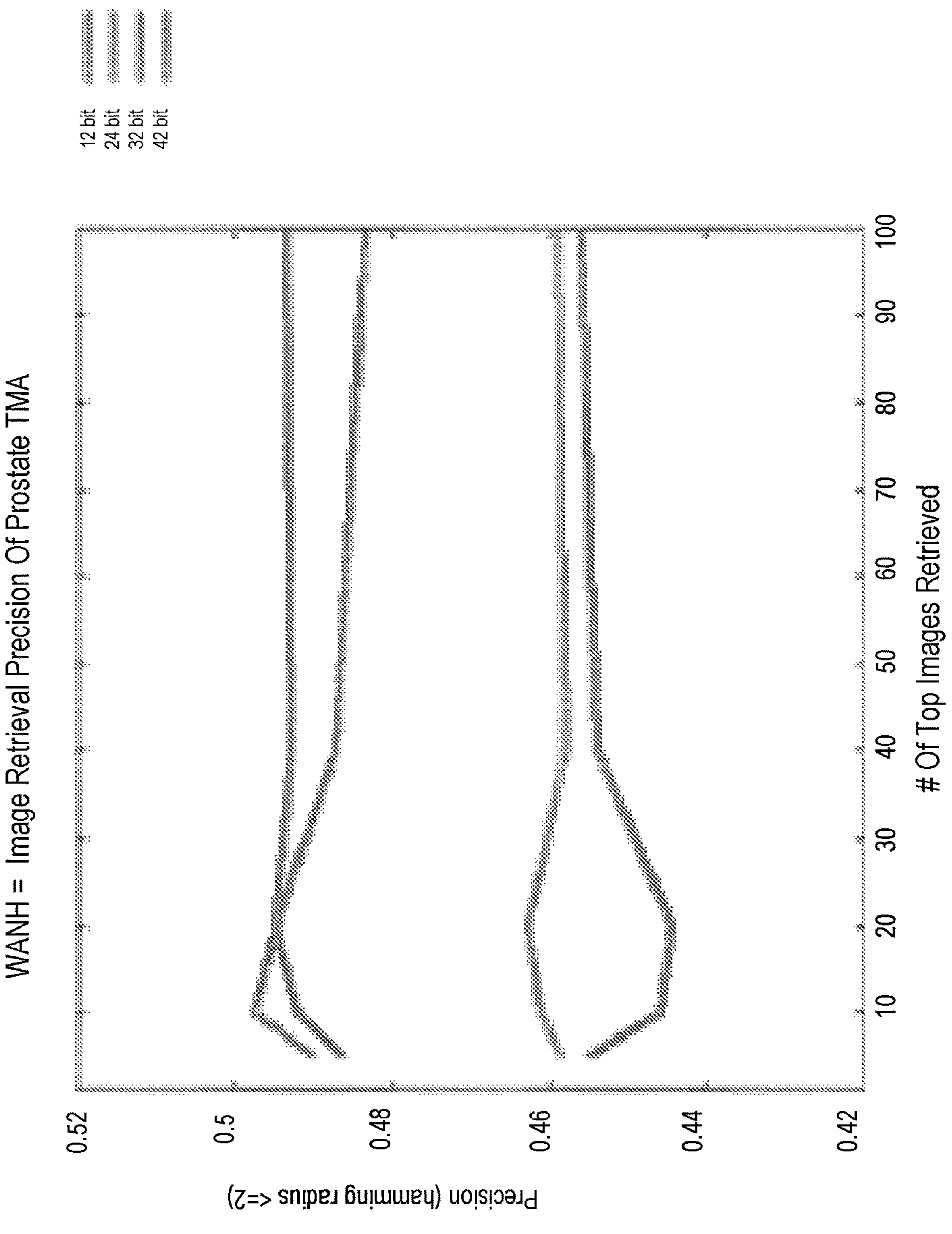
FIG. 11A depicts an embodiment of WANH corresponding prostate TMA with a precision within Hamming radius of 2 of WANH. X-axis is number of top images retrieved. Y-axis Precision within Hamming radius of 2. The precision curve at larger bit size vector yields increased precision. There is minute change in precision after 40 retrieved images.
Figure 11B:
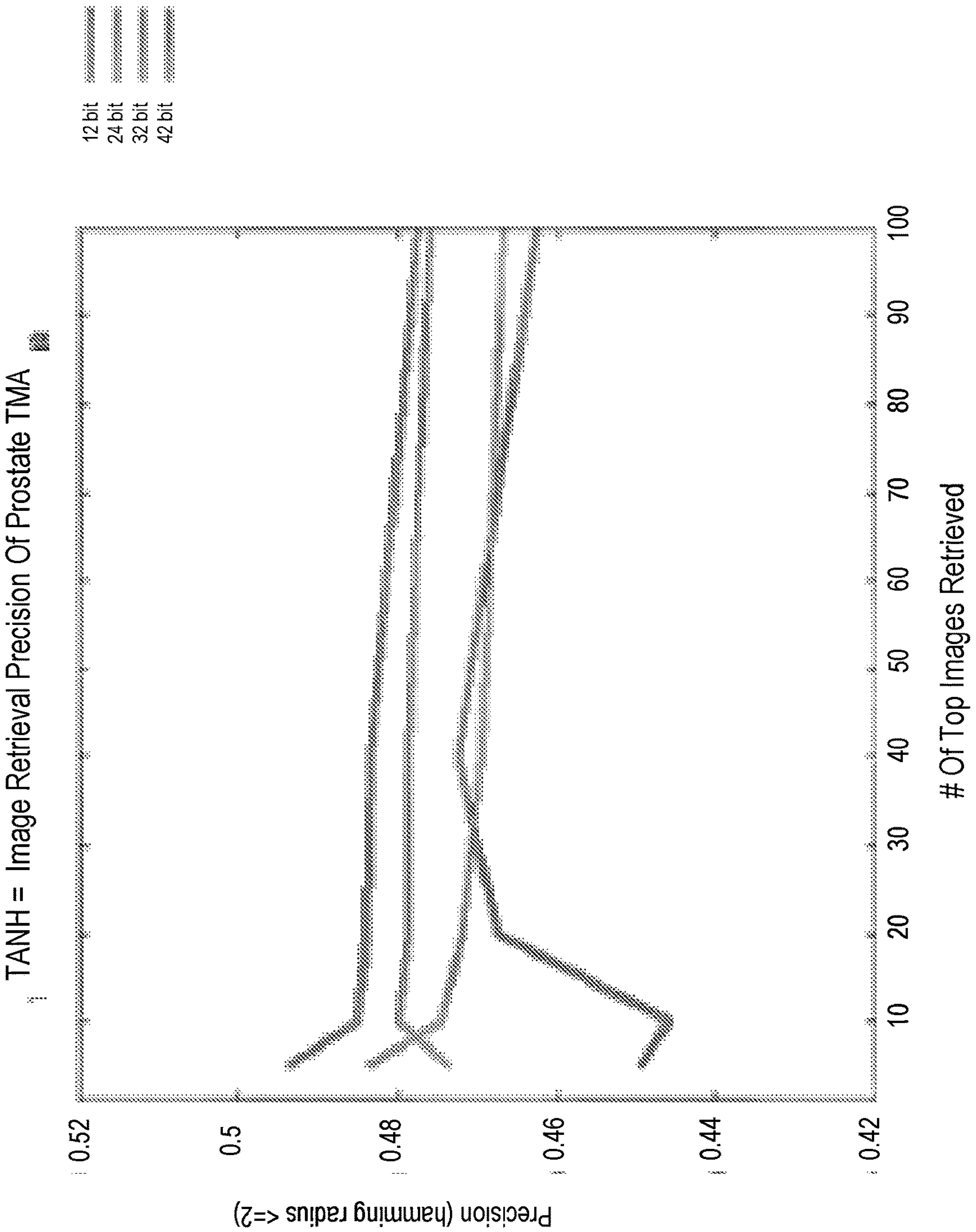
FIG. 11B depicts an embodiment of TANH corresponding prostate TMA with a precision within Hamming radius of 2 of TANH. X-axis is number of top images retrieved. Y-axis Precision within Hamming radius of 2. The precision curve at larger bit size vector yields increased precision. There is minute change in precision after 40 retrieved images.

Table 6 depicts the mean Average Precision and FIG. 11 depicts precision at K retrieved images.

B. SYSTEMS AND METHODS FOR SEMANTIC IMAGE RETRIEVAL

Figure 12:
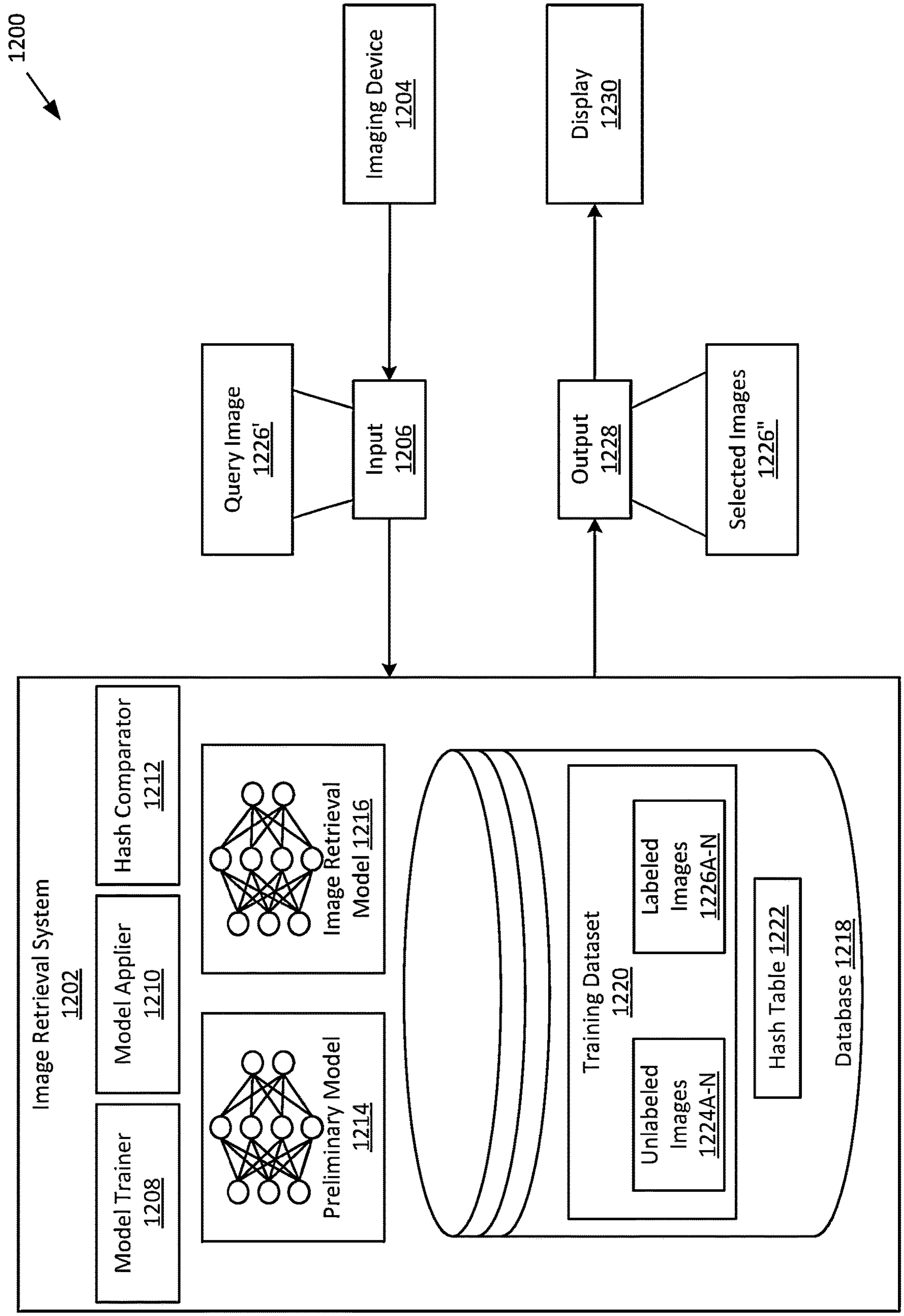
FIG. 12 depicts a block diagram of a system for training or applying models for semantic image retrieval.

Referring now to FIG. 12, depicted is a block diagram of a system for training or applying models for semantic image retrieval. In brief overview, the system 1200 may include at least one image retrieval system 1202 (sometimes generally referred to as a computing system), at least one imaging device 1204, and at least one display 1230, among others. The imaging device 1204, the image retrieval system 1202, and the display 1230 may be communicatively coupled to one another. The image retrieval system 1202 may include at least one input 1206, at least one model trainer 1208, at least one model applier 1210, at least one hash comparator 1212, at least one preliminary model 1214, at least one image retrieval model 1216, at least one database 1218, and at least one output 1228, among others. The at least one input 1206 can receive a query image 1226'. The at least one output 1228 can output at least one selected image 1226''. The at least one database 1218 may include or maintain at least one training dataset 1220 and a hash table 1222, among others. The at least one training dataset 1220 can include a plurality of unlabeled images 1224A-N (hereinafter generally referred to as unlabeled images 1224) and a plurality of labeled images 1226A-N (hereinafter generally referred to as labeled images 1226), among others. Each of the components in the system 1200 listed above may be implemented using hardware (e.g., one or more processors coupled with memory) or a combination of hardware and software as detailed herein in Section C. Each of the components in the system 1200 may implement or execute the functionalities detailed herein, such as those described in Section A.

In further detail, the image retrieval system 1202 itself and the components therein, such as the model trainer 1208, the model applier 1210, the hash comparator 1212, the preliminary model 1214 (sometimes referred to as an adversarial model), and the image retrieval model 1216, may have a training mode and a runtime mode (sometimes referred herein as an inference mode). Under the training mode, the image retrieval system 1202 may train or otherwise update the preliminary model 1214 using the unlabeled images 1224 of the training dataset 1220 and the image retrieval model 1216 using the labeled images 1226 of the training dataset 1220. In particular, the model trainer 1208 executing on the image retrieval system 1202 may initiate, establish, and maintain the preliminary model 1214 and the image retrieval model 1216. The initiation and establishment of the preliminary model 1214 may be under training mode and may use the unlabeled images 1224. In addition, the initiation and establishment of the image retrieval model 1216 may be under the training model and may use the labeled images 1226 of the training dataset 1220.

Figure 13A:
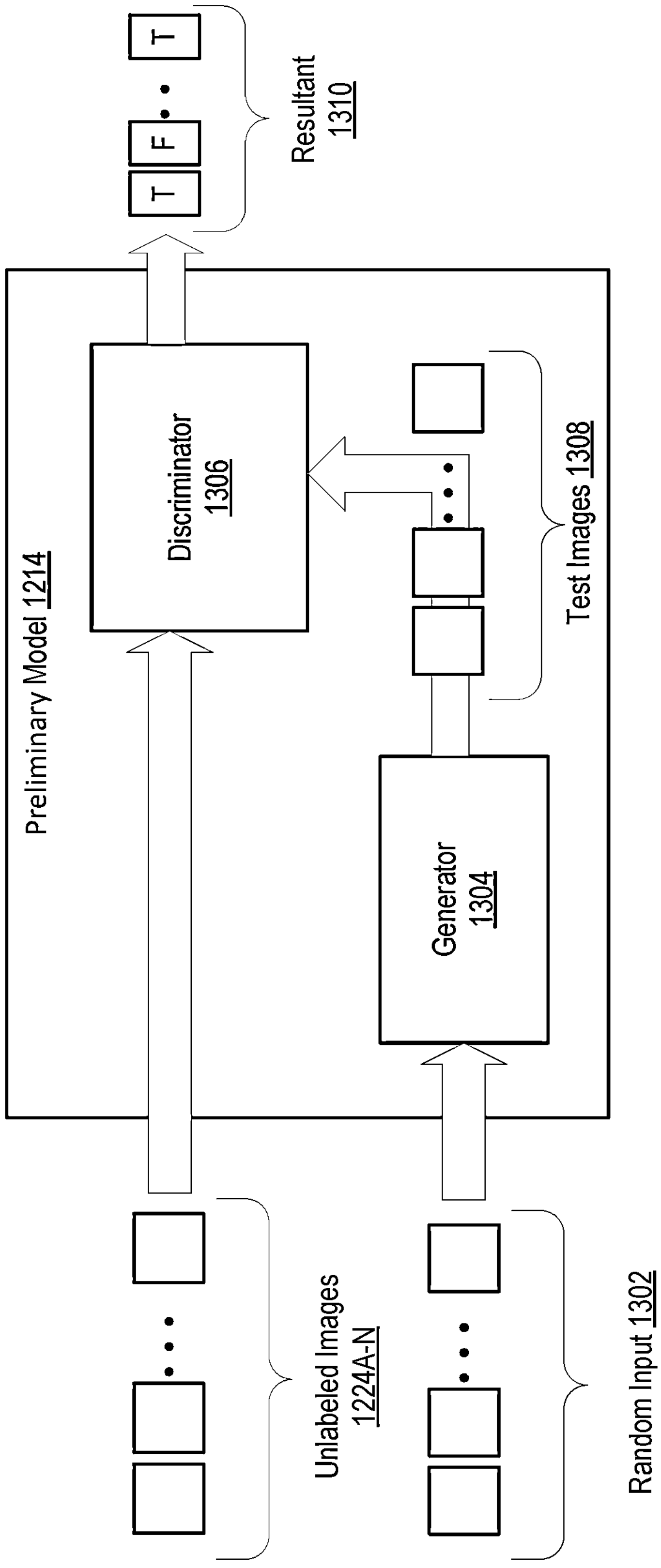
FIG. 13A depicts a block diagram of a preliminary model in the system for training models for semantic image retrieval.

Referring now to FIG. 13A, depicted is a block diagram of training the preliminary model 1214 of the image retrieval system 1202 for semantic image retrieval. The preliminary model 1214 may be an instance of the architecture detailed herein in conjunction with 3.1 and 3.2 of Section A. As depicted, the preliminary model 1214 may include at least one generator 1304 (sometimes referred herein as a generator network) and at least one discriminator 1306 (sometimes referred herein as a discriminator network). The configuration of the generator 1304 and the discriminator 1306 may be in accordance with a generative adversarial network (GAN) (e.g., as depicted), a variational auto-encoder, or other unsupervised or semi-supervised model, among others. Each of the generator 1304 and the discriminator 1306 of the preliminary model 1214 may have at least one input and at least one output. The input to the preliminary model 1214 may correspond to the inputs of the generator 1304 and the discriminator 1306. The input to the generator 1304 may include random input 1302 (or corresponding random noise distribution vectors) to be processed one-by-one by the generator 1304. The random input 1302 may be generated using a pseudo-random number generator. The output of the generator 1304 may include a test images 1308 (or corresponding feature space representations) corresponding to the random input 1302. The output of the generator 1304 may be fed into the input of the discriminator 1306. The input of the discriminator 1306 may thus include the test images 1308. The output of the discriminator 1306 may include a resultant 1310.

In each of the generator 1304 and the discriminator 1306, the input and the output may be related to each other via a set of weights (sometimes referred herein as parameters, kernel parameters, or neural parameters) to be applied to the input to generate the output. In some embodiments, the set of weights may be arranged in one or more transform layers.

Each layer may specify a combination or a sequence of application of the weights. The layers may be arranged in accordance with the machine learning algorithm or model for the preliminary model 1214, for example, as detailed herein in conjunction with FIGS. 13B-13E.

When in training mode, the model trainer 1208 may access the database 1218 to identify unlabeled images 1224 included in the training dataset 1220 maintained therein. The training dataset 1220 may include one or more unlabeled images 1224. In some embodiments, each unlabeled image 1224 of the training dataset 1220 may be a training image. For instance, the training dataset 1220 can include a corpus of unlabeled image 1224. The unlabeled images 1224 can include, for example, images of text, various scenery, and assorted objects, among others. Each unlabeled image 1224 can be a color image that is scaled down to 32×32 pixels from an image extracted from the World Wide Web. In some embodiments, the unlabeled images 1224 can also be microscope slides of cancer patients, such as prostate cancer patients. Each unlabeled image 1224 can be sourced from a whole slide scanner, downscaled from approximate size of 150 k×80 k pixels to 32×32 pixels upon tiling the unlabeled whole slide image, and have a pixel intensity satisfying a predetermined threshold. For instance, the unlabeled images 1224 may be an instance of the architecture detailed herein in conjunction with FIG. 8 and Section A.

The model trainer 1208 may generate random input 1302 to apply to the generator 1304. The random input 1302 can be a random noise distribution vector, z, which goes through the generator 1304 with parameters $\theta^G$. For example, the model trainer 1208 may using random input 1302 to train the generator 1304. The model trainer 1208 can train the preliminary model 1214 on datasets having diverse images or overlapping data. The generator 1304 can be represented as $G(z; \theta^G)$. The generator 1304 can produce samples from a random noise distribution vector, z, which goes through G(z) with parameters $\theta^G$.

In training the preliminary model 1214, the model applier 1210 may apply the random inputs 1302 to the generator 1304. The model applier 1210 may feed each individual random input 1302 to the generator 1304. The model applier 1210 may apply the weights of the generator 1304 to each random input 1302 to generate a corresponding test image 1308. The test image may be similar to the unlabeled images 1224. For instance, the test image 1308 may be an instance of the architecture detailed herein in conjunction with FIG. 3 and Section A. In applying, the model applier 1210 may process each random input 1302 in accordance with the weights of the generator 1304 and may identify the corresponding test image 1308 output by the generator 1304. The test image 1308 may generally be similar or synthesized form of unlabeled image 1224.

In conjunction, the model applier 1210 may identify or select one of the unlabeled images 1224 or the test images 1308 to the discriminator 1306. In applying, the model applier 1210 may feed the selected input to the discriminator 1306 and process the input in accordance with the weights of the discriminator 1306. The model applier 1210 may identify a resultant 1310 output from the discriminator 1306. The resultant 1310 may indicate whether the input is determined to be from set of unlabeled images 1224 or the set of test images 1308. For example, the resultant 1310 may indicate the Boolean value of “true” (e.g., “T” as depicted) when the input is determined to be from one of the unlabeled images 1224. Conversely, the resultant 1310 may indicate the Boolean value of “false” (e.g., “F” as depicted) when the input is determined to be from one of the test images 1308. While training, the accuracy of the determination regarding the source of the input by the discriminator 1306 may increase.

Figure 13B:
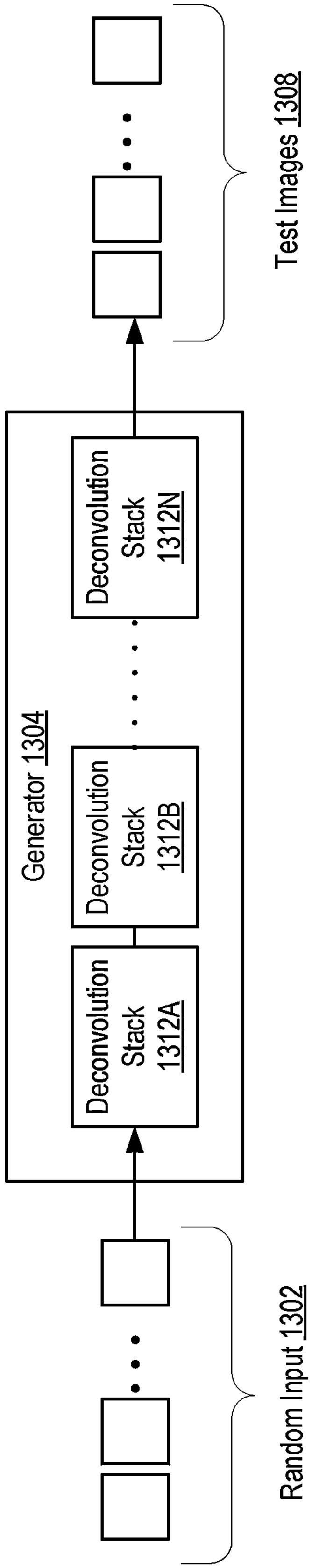
FIG. 13B depicts a block diagram of a generator block of a preliminary model in the system for training models for semantic image retrieval.

Referring now to FIG. 13B, depicted is a block diagram of the generator 1304 of the preliminary model 1214 in the system 1200 for training models for semantic image retrieval. The model trainer 1208 can train the generator 1304. The generator 1304 of the preliminary model 1214 may include at least one input and at least one output. The input can be the random input 1302. The output can be test images 1308. The generator 1304 can have a set of deconvolution stacks 1312A-N (hereinafter generally referred to as deconvolution stacks 1312).

The generator 1304 can generate and output the test images 1308 (or a corresponding feature space representation) based on a liner transformation of discrete numbers drawn from the random input 1302. The random input 1302, for example, can be a normal distribution having that has a series of spatial full-convolution followed by Leaky-ReLU activation functions. The generator 1304 can generate test images 1308 from the corresponding random inputs 1302 using the deconvolution stack 1312.

The input and the output of the generator 1304 may be related via the weights as defined in the set of deconvolution stacks 1312. Each deconvolution stack 1312 may define or include the weights of the generator 1304. The set of deconvolution stacks 1312 can be arranged in series (e.g., as depicted) or parallel configuration, or in any combination. In a series configuration, the input of one deconvolution stacks 1312 may include the output of the previous deconvolution stacks 1312 (e.g., as depicted). In parallel configuration, the input of one deconvolution stacks 1312 may include the input of the entire generator 1304.

Figure 13C:
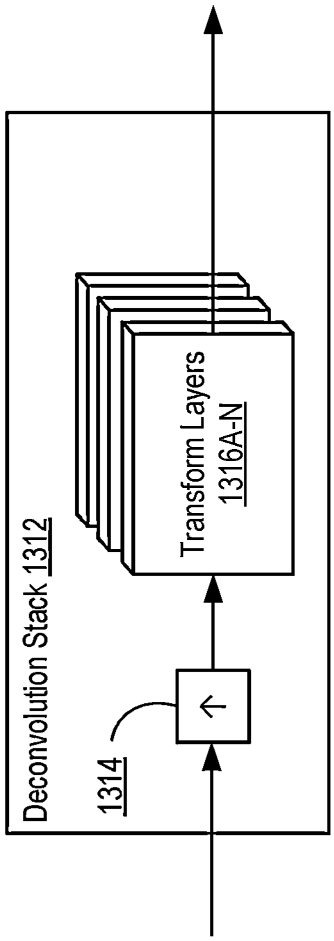
FIG. 13C depicts a block diagram of a deconvolution stack in a generator block of the preliminary model in the system for training models for semantic image retrieval.

Referring now to FIG. 13C, depicted is a block diagram of a deconvolution stack 1312 of the generator 1304 of the preliminary model 1214 in the system for training models for semantic image retrieval. Each deconvolution stack 1312 can have at least one up-sampler 1314 and at least one set of transform layers 1316A-N (hereinafter generally referred to as transform layers 1316).

The input to the deconvolution stack 1312 may include the random input 1302 when the deconvolution stack 1312 is the first in the generator 1304. The input may include the test images 1308 from a previous deconvolution stack 1312 when the deconvolution stack 1312 is not the first in the generator 1304. The up-sampler 1314 and the set of transform layers 1316 can include one or more weights to modify or otherwise process the input to produce or generate an output test images 1308. The up-sampler 1314 may increase the image resolution of the test images 1308 to increase a dimension (or resolution) to fit the set of transform layers 1316. In some implementations, the up-sampler 1314 can apply an up-sampling operation to increase the dimension of the test images 1308. The up-sampling operation may include, for example, expansion and an interpolation filter, among others. In performing the up-sampling operation, the up-sampler 1314 may insert null (or default) values into the test images 1308 to expand the dimension. The insertion or null values may separate the pre-existing values. The up-sampler 1314 may apply a filter (e.g., a low-pass frequency filter or another smoothing operation) to the expanded feature map. With the application, the up-sampler 1314 may feed the resultant test images 1308 into the transform layers 1316.

The set of transform layers 1316 can be arranged in series, with an output of one transform layer 1316 fed as an input to a succeeding transform layer 1316. Each transform layer

1316 may have a non-linear input-to-output characteristic. The transform layer 1316 may comprise a convolutional layer, a normalization layer, and an activation layer (e.g., a rectified linear unit (ReLU)), among others. In some embodiments, the set of transform layers 1316 may be a convolutional neural network (CNN). For example, the convolutional layer, the normalization layer, and the activation layer (e.g., a rectified linear unit (ReLU)) may be arranged in accordance with CNN. The transform layers 1316 may define or include the weights of the corresponding deconvolution stack 1312 in the generator 1304.

Figure 13D:
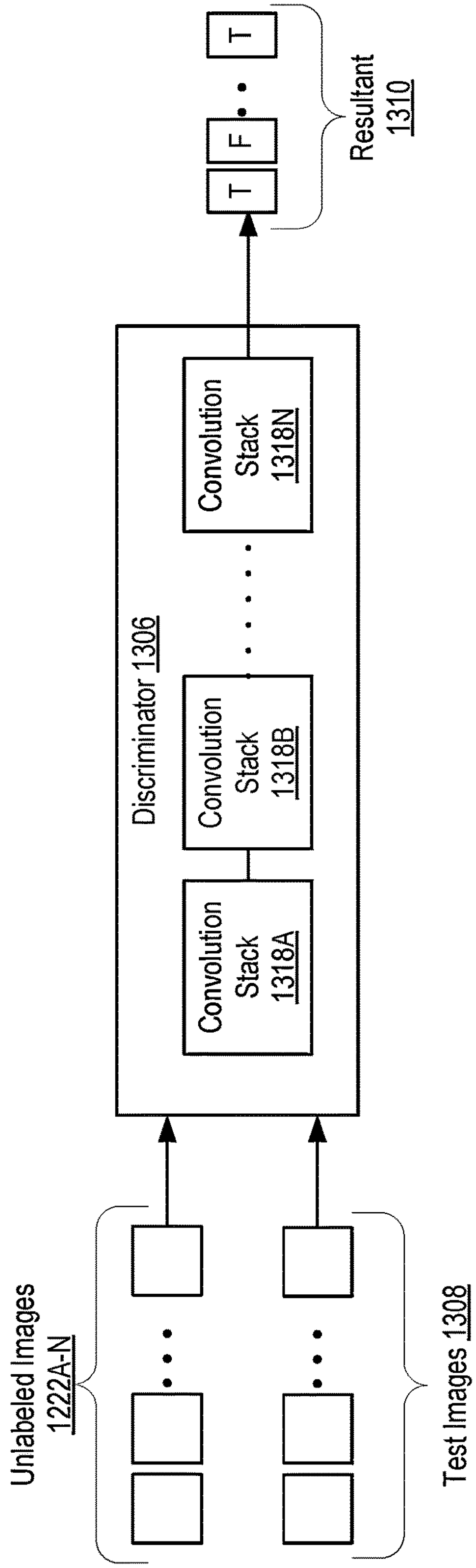
FIG. 13D depicts a block diagram of a discriminator block of the preliminary model in the system for training models for semantic image retrieval.

Referring now to FIG. 13D, depicted is a block diagram of the discriminator 1306 of the preliminary model 1214 in the system for training models for semantic image retrieval. The discriminator 1306 of the preliminary model 1214 may include at least one input and at least one output. The input to the discriminator 1306 can be the test images 1308 from the generator 1304 or unlabeled image 1224. The output can be the resultant 1310. The discriminator 1306 can have a set of convolution stacks 1318A-N (hereinafter generally referred to as convolution stacks 1318).

The input and the output of the discriminator 1306 may be related via the weights as defined in the set of convolution stacks 1318. Each convolution stack 1318 may define or include the weights the discriminator 1306. The set of convolution stacks 1318 can be arranged in series (e.g., as depicted) or parallel configuration, or in any combination. In a series configuration, the input of one convolution stacks 1318 may include the output of the previous convolution stacks 1318 (e.g., as depicted). In parallel configuration, the input of one convolution stacks 1318 may include the input of the entire discriminator 1306.

In some embodiments, the discriminator 1306 can output the resultant 1310, which can include 4 layers of convolution operations of field view 4×4 with a padding 1×1 and stride 2×2 where first layer learns 64 filter maps, and then double the number of filter maps at each succeeding layer with no pooling operation employed, with batch-normalization in each layer, followed by 2 fc layers of [4096 to 256, 256 to 1] with dropout 0.25. By transferring the features within a domain, the features learned in GAN training can adapt to the domain of the target.

Figure 13E:
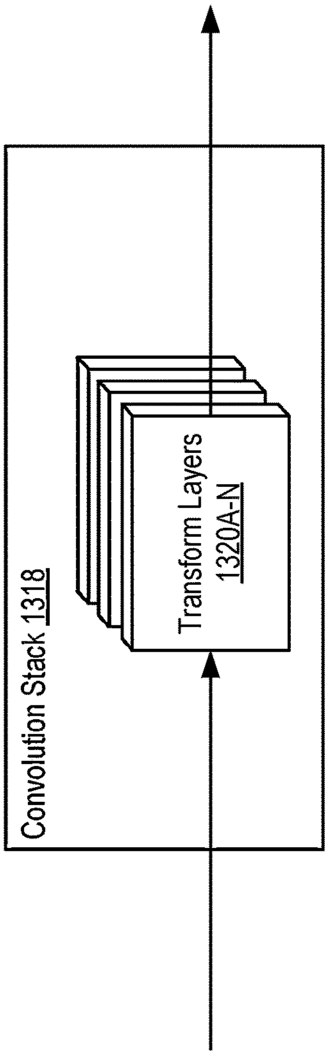
FIG. 13E depicts a block diagram of a convolution stack in a discriminator block of a preliminary model in the system for training models for semantic image retrieval.

Referring now to FIG. 13E, depicted is a block diagram of a convolution stack 1318 in the discriminator block 1306 of the preliminary model 1214 in the system 1200 for training models for semantic image retrieval. Each convolution stack 1318 in the convolution stack 1318 can have a set of transform layers 1320A-N (hereinafter generally referred to as transform layers 1320). The set of transform layers 1320 can include one or more weights to modify or otherwise process the input to produce or generate the resultant 1310. The input may include one of the unlabeled image 1224 and the test images 1308 when the convolution stack 1318 is the first in the discriminator 1306. As discussed above, the resultant 1310 may indicate whether the input is from the set of unlabeled images 1224 or from the set of test images 1308 from the generator 1304. The set of transform layers 1320 can be arranged in series, with an output of one transform layer 1320 fed as an input to a succeeding transform layer 1320. Each transform layer 1320 may have a non-linear input-to-output characteristic. The transform layer 1320 may comprise a convolutional layer, a normalization layer, and an activation layer (e.g., a rectified linear unit (ReLU)), among others. In some embodiments, the set of transform layers 1320 may be a convolutional neural network (CNN). For example, the convolutional layer, the normalization layer, and the activation layer (e.g., a rectified linear unit (ReLU)), among others, may be arranged in accordance with CNN. The transformation layer 1320 may define or include the weights of the corresponding convolution stack 1318 in the discriminator 1306.

The model trainer 1208 may train the discriminator 1306 using the unlabeled images 1224 or the output of the generator 1304. In particular, the generator 1304 outputs plausible data based on learning using the unlabeled images 1224, which become negative training examples for the discriminator. By comparing the plausible data to the labeled images 1226, which are real images, the discriminator can then learn to distinguish between the fake images of the discriminator 1306 and the real images that are the labeled images 1226A-N. The discriminator 1306 can be represented as D(x). The architectural design of the generator 1304 and the discriminator 1306 can include fully-connected (fc) layers. In some embodiments, the training of the generator 1304 may be performed separately from the discriminator 1306, or vice-versa. In some embodiments, the training of the generator 1304 and the discriminator 1306 may be performed in conjunction. The discriminator 1306 can distinguish between the real data distribution, $p_{data}(x)$, and the distribution $p_z(z)$ generated by the generator 1304. The discriminator network can define the loss function of the generator to minimize the log(1−D(z)). The discriminator network can also define the loss function to maximize the probability of correctly classifying between the real and the model generated samples.

The model trainer 1208 may update the weights of the generator 1304 or the discriminator 1306 in the preliminary model 1214 based on a comparison between the resultant 1310 and the source of the input (e.g., the set of unlabeled images 1224 and the test images 1308). In comparing, the model trainer 1208 may identify the source of the input to the discriminator 1306 to determine whether the source indicated by the resultant 1310 matches the source used as the input. When the resultant 1310 indicates that the source is from the unlabeled image 1224 and the source used for the input is from the unlabeled image 1224 (e.g., a true positive), the model trainer 1208 may determine that the resultant 1310 outputted by the discriminator 1306 is accurate. Likewise, when the resultant 1310 indicates that the source is from the test image 1308 and the source used for the input is from the test images 1308 (e.g., a true negative), the model trainer 1208 may determine that the resultant 1310 outputted by the discriminator 1306 is accurate. On the contrary, when the resultant 1310 indicates that the source is from the unlabeled image 1224 and the source used for the input is from the test image 1308 (e.g., a false negative), the model trainer 1208 may determine that the resultant 1310 outputted by the discriminator 1306 is inaccurate. Likewise, when the resultant 1310 indicates that the source is from the test image 1308 and the source used for the input is from the unlabeled image 1224 (e.g., a false positive), the model trainer 1208 may determine that the resultant 1310 outputted by the discriminator 1306 is inaccurate.

Based on the determinations on accuracy, the model trainer 1208 may calculate or determine the loss metric. The loss metric may indicate a degree of deviation in accuracy of the discriminator 1306 in determining the source of the input. The model trainer 1208 can calculate or determine the loss function by replicating a probability distribution. For instance, the model trainer 1208 can apply a minimax loss function, a Wasserstein loss function, any other loss function, or more than one loss function. In accordance with the loss function, the model trainer 1208 may update one or more weights of the preliminary model 1214. The updating of weights may be in accordance with an optimization function (or an objective function) for the image preliminary model 1214. The optimization function may define one or more rates or parameters at which the weights of the preliminary model 1214 are to be updated. For example, the model trainer 1208 may use the optimization function with a set learning rate, a momentum, and a weight decay for a number of iterations in training. The updating of the weights may be repeated until a convergence condition.

Figure 14A:
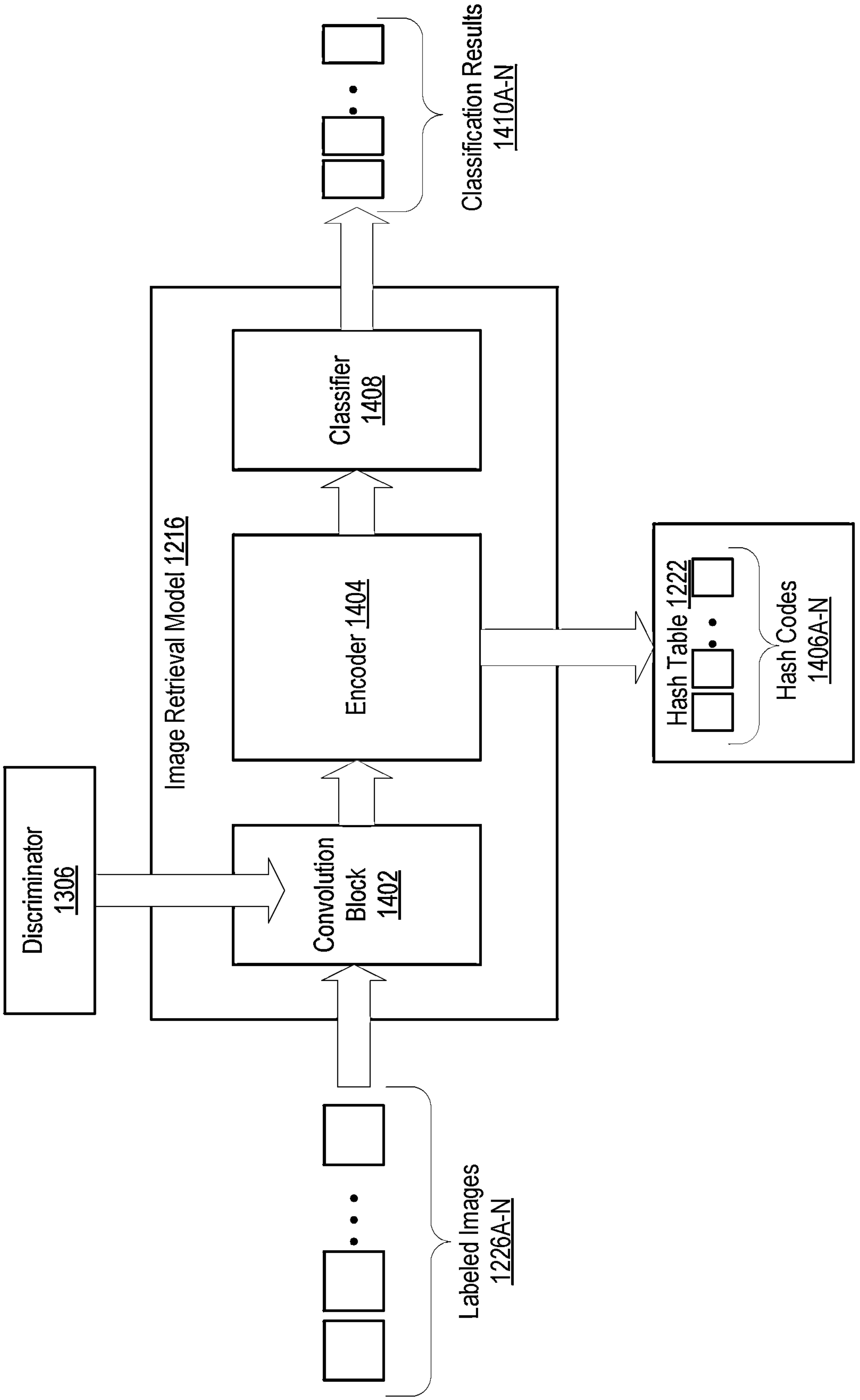
FIG. 14A depicts a block diagram of an image retrieval model in the system for training or applying models for semantic image retrieval.

Now referring to FIG. 14A, depicted is a block diagram of an image retrieval model 1216 in the system for training or applying models for semantic image retrieval. The image retrieval model 1216 may be an instance of the architecture detailed herein in conjunction with 3.1 and 3.3 in Section A. The image retrieval model 1216 can be used to generate a compact and discriminative set of hash codes with a small set of labeled images 1226 from the target domain dataset. As depicted, the image retrieval model 1216 may include at least one convolution block 1402 (sometimes referred herein as a convolution network), at least one encoder 1404 (sometimes referred herein as an encoder module or encoder network), and at least one classifier 1408 (sometimes referred herein as a classifier module or classifier network).

The image retrieval model 1216 may have at least one input in at least one output. The input to the image retrieval model 1216 may correspond to the inputs of the convolution block 1402. The output of the image retrieval model 1216 may correspond to the output of the encoder 1404 and the classifier 1408. Each of the convolution block 1402, the encoder 1404, and the classifier 1408 of the image retrieval model 1216 may have at least one input and at least one output. The input to the convolution block 1402 may include images 1226A-N to be processed one-by-one by the convolution block 1402. The output of the convolution block 1402 may be the input to the encoder 1404. The outputs of the encoder 1404 may be the hash codes 1406A-N (generally referred to as hash code 1406) and the input to the classifier 1408. The output of the classifier 1408 may be the classification results 1410. In each of the convolution block 1402, the encoder 1404, and the classifier 1408, the input and output may be related to each other via a set of weights (sometimes referred herein as parameters, kernel parameters, or neural parameters) to be applied to the input to generate the output. In some embodiments, the set of weights may be arranged in one or more transform layers. Each layer may specify a combination or a sequence of application of the weights. The layers may be arranged in accordance with the machine learning algorithm When in training mode, the model trainer 1208 may establish the image retrieval model 1216 (including its components, such as the convolution block 1402, the encoder 1404, and the classifier 1408.). The initiate and establishment of the image retrieval model 1216 may be under the training mode and may use the labeled images 1226 of the training dataset 1220. In establishing the image retrieval model 1216, the model trainer 1208 may transfer the weights of the discriminator 1306 of the preliminary model 1214 to the convolution block 1402. The transferal may be performed in response to the completion of training of the discriminator 1306. With the transferal, the convolution block 1402 of the image retrieval model 1216 may include the set of convolution stacks 1318 and the transform layers 1320 in each convolution stack 1318 from the discriminator 1306. In some embodiments, the model trainer 1208 may assign or set the values of the weights of the convolution block 1402 to the values of the weights of the discriminator 1306. In some embodiments, the model trainer 1208 may assign or set the set of convolution stacks 1318 and the transform layers 1320 in each convolution stack 1318 from the discriminator 1306 to the convolution block 1402.

With the transferal of the weights from the discriminator 1306, the model trainer 1208 may initiate training of the image retrieval model 1216 using the labeled images 1226 from the training dataset 1220. The model trainer 1208 may access the database 1218 to identify labeled images 1226 included in the training dataset 1220 maintained therein. The unlabeled images 1224 and the labeled images 1226 may be of different domains. For example, while the unlabeled images 1224 can be part of any domain such as random text or images, the labeled images 1226 may be part of the target domain data set as described in section A. In addition, the number of labeled images 1226 used to train the image retrieval model 1216 may be less than the number of unlabeled images 1224 used to train the preliminary model 1214. In some embodiments, the number of labeled images 1226 may be of at least one magnitude less than the number of unlabeled images 1224. For example, there may be 50,000 unlabeled images 1224 used to train the preliminary model 1214, and 5,000 labeled images 1226 for training the image retrieval model 1216.

In some embodiments, the labeled image 1226 may be biomedical images, which may be acquired in accordance with microscopy techniques or a histopathological image preparer, such as using an optical microscope, a confocal microscope, a fluorescence microscope, a phosphorescence microscope, an electron microscope, among others. The labeled image 1226 may be, for example, a histological section with a hematoxylin and eosin (H&E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The biomedical image for the labeled image 1226 may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject. For instance, the labeled images 1226 may be an instance of the architecture detailed herein in conjunction with FIG. 9, FIG. 10, or Section A.

Each sample labeled image 1226 may include or be associated with one or more annotations. Each annotation may include or identify a classification for the labeled image 1226. For example, a classification identified by one annotation for the labeled image 1226A may indicate that the labeled image 1226A is of a pancreas tissue sample. In addition, another classification identified by another annotation for the labeled image 1226B may indicate that the labeled image 1226B is of a prostate tissue sample. In some embodiments, the annotation may include or identify a score for the classification for the labeled image 1226A. For example, the annotation may identify a particular Gleason score for a prostate tissue sample depicted in a labeled image 1226.

In training the image retrieval model 1216, the model applier 1210 may apply the labeled images 1226 to the image retrieval model 1216. The model applier 1210 may feed each individual labeled image 1226 to the image retrieval model 1216. The model applier 1210 may apply the weights of the image retrieval model 1216 (e.g., the weights in the convolution block 1402, the encoder 1404, and the classifier 1408) to each labeled image 1226 to generate an output class. In applying, the model applier 1210 may process each labeled image 1226 in accordance with the weights of the convolution block 1402 and may identify an output (e.g., a corresponding feature map) from the convolution block 1402.

The model applier 1210 may process the output from the convolution blocks 1402 in accordance with the weights of the encoder 1404. The encoder 1404 may produce a hash code 1406A-N (hereinafter generally referred to as a hash code 1406) corresponding to the labeled image 1226 and the input from the convolution blocks 1402. The encoder 1404 can learn and produce hash codes 1406 for the hash table 1222 to encode semantic similarity of the labeled image 1226 based on back-propagation. In particular, the weights in the layers of the encoder 1404 can be randomly initialized, and each hash code 1406 can be learned by backpropagation. The hash code 1406 may include a set of values (e.g., binary, hexadecimal, decimal, or alphanumeric). Each value of the hash code 1406 may correspond to or represent information regarding the labeled image 1226. The set of values in the hash code 1406 may correspond to a color, a texture, an object type, an edge type, or semantic information, among others.

With the generation of the hash codes 1406 for the labeled images 1226, the model trainer 1208 may store and maintain at least a subset of the corresponding hash codes 1406 on the hash table 1222 on the database 1218. In some embodiments, the model trainer 1208 may store the hash codes 1406 for a set of images (referred herein as set of candidate images) that are generated by the encoder 1404 after convergence of the image retrieval model 1216. The images may be similar (e.g., same domain) as the domain of the labeled images 1226. In some embodiments, the model trainer 1208 may associate the hash code 1406 with the image used to generate the hash code 1406. The model trainer 1208 may store and maintain the association on the database 1218. In some embodiments, the model trainer 1208 may store the association with the hash code 1406 within the hash table 1222 on the database 1218.

The model applier 1210 may process the hash code 1406 output from the encoder 1404 in accordance with the weights of the classifier 1408. From processing, the model applier 1210 may identify classification results 1410A-N (hereinafter generally referred to as classification results 1410) corresponding to the labeled images 1226 fed into the image retrieval model 1216. The classifier 1408 can generate a classification of each of the labeled images 1226. For example, the classification result 1410 can indicate the corresponding labeled images 1226 is of a prostate tissue sample of a particular Gleason score. The classification results 1410 may be used as discussed below to train and update one or more weights of the image retrieval model 1216.

Figure 14B:
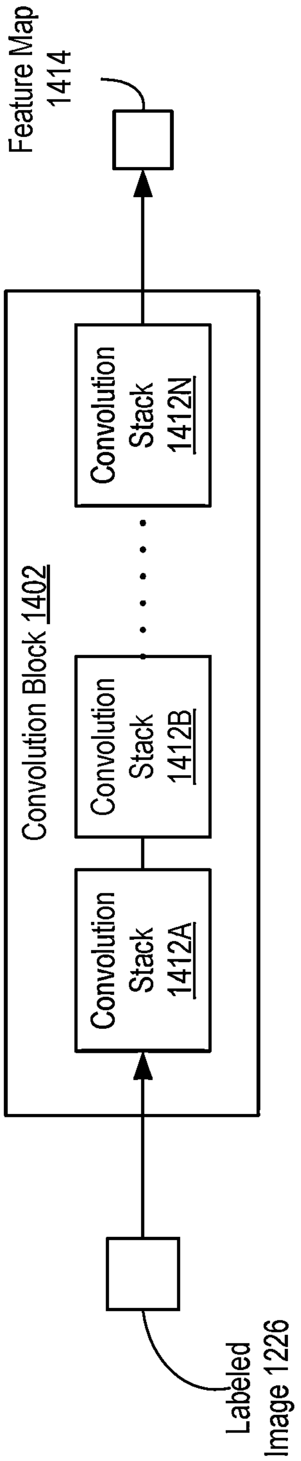
FIG. 14B depicts a block diagram of a convolution block of the image retrieval model in the system for training or applying models for semantic image retrieval.

Referring now to FIG. 14B, depicted is the convolution block 1402 of the image retrieval model 1216 in the system 1200 for training or applying models for semantic image retrieval. The convolution block 1402 of the image retrieval model 1216 may include at least one input and at least one output. The input to the convolution block 1402 can be the labeled image 1226*a*. The output can be the feature map 1414 (or corresponding feature space representations). The convolution block 1402 can have a set of convolution stacks 1412A-N (hereinafter generally referred to as convolution stacks 1412). Each convolution stack 1412 may define or include the weights in the convolution block 1402.

The input and the output of the convolution block 1402 may be related via the weights as defined in the set of convolution stacks 1412. The set of convolution stacks 1412 can be arranged in series (e.g., as depicted) or parallel configuration, or in any combination. In a series configuration, the input of one convolution stacks 1412 may include the output of the previous convolution stacks 1412 (e.g., as depicted). In parallel configuration, the input of one convolution stacks 1412 may include each of the labeled images 1226. The set of convolution stacks 1412 of the convolution block 1402 may be the same as the set of convolution stacks 1318 of the discriminator 1306 upon transferal.

Figure 14C:
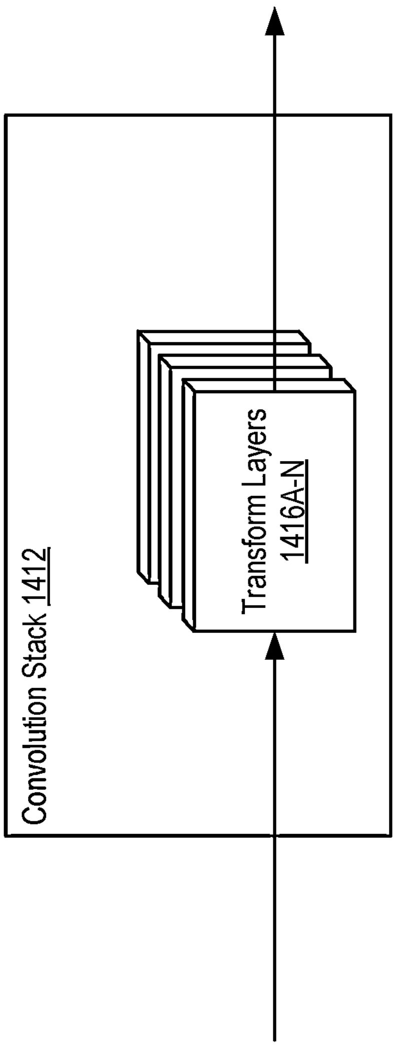
FIG. 14C depicts a block diagram of a convolution stack in a convolution block of the image retrieval model in the system for training or applying models for semantic image retrieval.

FIG. 14C depicts a block diagram of a convolution stack 1412 in the convolution block 1402 of the image retrieval model 1216 in the system 1200 for training models or applying for semantic image retrieval. Each convolution stack 1412 can have a set of transform layers 1416A-N (hereinafter generally referred to as transform layers 1416). The set of transform layers 1416 can include one or more weights to modify or otherwise process the input to produce or generate the feature map 1414. The input may include one of the labeled image 1226 when the convolution stack 1412 is the first in the convolution block 1402. The input may include the feature map 1414 from a previous convolution stack 1412 when the convolution stack 1412 is not the first in the convolution block 1402. The feature map 1414 may correspond to one of the labeled image 1226 and the feature map 1414. The transform layers 1416 may comprise a convolutional layer, a normalization layer, and an activation layer (e.g., a rectified linear unit (ReLU)), among others. The set of transform layers 1416 can be arranged in series, with an output of one transform layer 1416 fed as an input to a succeeding transform layer 1416. Each transform layer 1416 may have a non-linear input-to-output characteristic. In some embodiments, the set of transform layers 1416 may be a convolutional neural network (CNN). For example, the convolutional layer, the normalization layer, and the activation layer (e.g., a rectified linear unit (ReLU)) may be arranged in accordance with CNN. The transform layers 1416 may define or include the weights of the corresponding convolution stack 1412.

Figure 14D:
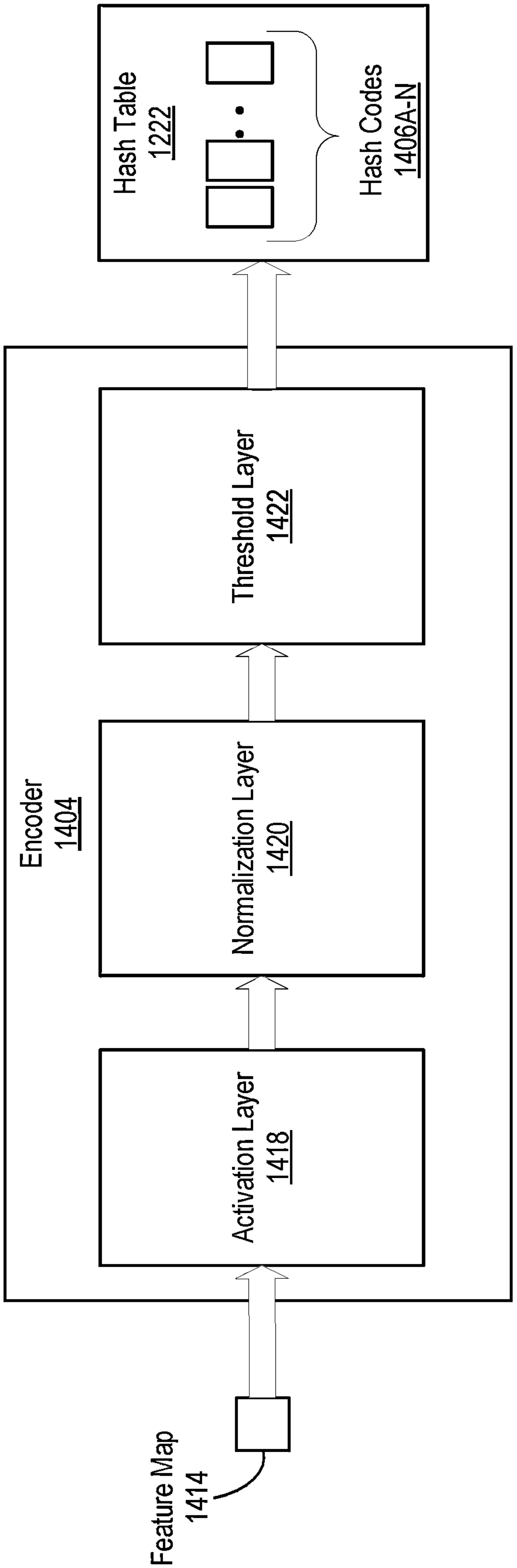
FIG. 14D depicts a block diagram of an encoder block of the image retrieval model in the system for training or applying models for semantic image retrieval.

FIG. 14D depicts a block diagram of the encoder 1404 of the image retrieval model 1216 in the system 1200 for training or applying models for semantic image retrieval. The encoder may be an instance of the architecture detailed herein in conjunction with 3.3 in Section A. The image retrieval model 1216 can thus learn a compact and yet discriminative set of hash codes with a small set of labeled images 1226A-N from the target domain dataset. The encoder 1404 can be empirically designed based on a grid search. The encoder 1404 can receive, via the convolution block 1402, the 256(L5) sigmoid activated neurons from the preliminary model 1214 followed by sigmoid activated neurons, batch-normalization, and L-2norm. The output of the L-2norm comprises h, a number of bits to be learned. The neurons and can be a precursor setup to learn gradients for efficient hash codes in the threshold-layer.

As depicted, the encoder 1404 may include at least one activation layer 1418 (sometimes referred herein as an activation network), at least one normalization layer 1420 (sometimes referred herein as a normalization network), and at least one threshold 1422 (sometimes referred herein as a threshold network). The encoder 1404 may have at least one input and at least one output. The input of the encoder 1404 can be the feature map 1414 generated by the convolution block 1402, and the output of the encoder 1404 can be the hash codes 1406 for storage in the hash table 1222. The dimensions of the input feature map 1414 may be the same as the dimensions of the corresponding output hash code 1406. For example, if the feature map 1414 includes n bits, the corresponding hash code 1406 outputted by the encoder 1404 may also be n bits. The image activation layer 1418 may have at least one input at least one output. The input to the activation layer 1418 may correspond to the inputs of the encoder 1404. The output of the activation layer 1418 may correspond to the input of the normalization layer 1420. The output of the normalization layer 1420 may correspond to the input of the threshold. The output of the threshold 1422 may correspond to the output of the encoder 1404.

The activation layer 1418 of the encoder 1404 may include at least one function to apply to feature map 1414. The function of the activation layer 1418 may be an activation function, such as a sigmoid function (e.g., the fully connected sigmoid function as discussed in Section A), an identity function, a unit step function, a hyperbolic function, an arcus function, or a rectifier function (max(0, x)), among others. The function may be set, adjusted, or modified by training. The activation function may be nonlinear. The activation layer 1418 may traverse each feature map 1414. While traversing, the activation layer 1418 may apply the activation function to the input to generate an output. Because of the activation function, the output of the activation layer 1418 may be non-linear relative to the input.

The normalization layer 1420 of the encoder 1404 may include at least one function to apply to the output of the activation layer 1418. In some embodiments, the encoder 1404 may include one or more normalization layers 1420. The function of the normalization layer 1420 may include one or more parameters to apply to the input. The function applied by the normalization layer 1420 may include a batch normalization (e.g., as discussed above in Section A), an L-norm (e.g., L2-norm as discussed above in Section A), a weight normalization, an instance normalization, a group normalization, or any combination thereof, among others. The function may be set, adjusted, or modified by training. The normalization layer 1420 may identify a range of values of the input. From the range of values, the normalization layer 1420 may identify a minimum value, a maximum value, and a difference between the minimum value and the maximum value for the input. The normalization layer 1420 may determine a transformation factor based on the minimum value, the maximum value, and the difference between the minimum value and the maximum value (e.g., as a linear function). The normalization layer 1420 may then apply (e.g., multiply) the transformation factor to all the input to form the output.

The threshold layer 1422 of the encoder 1404 can be used to generate or produce hash codes 1406 that can encode semantic similarity among the images (e.g., labeled images 1226). The threshold layer 1422 may include an input and output, and a set of weights relating the input and output. The threshold layer 1422 may be an instance of a convolution stack (e.g., similar to the convolution stack 1318 or 1412) with transform layers (e.g., similar to the transform layers 1320 or 1422). The input of the threshold layer 1422 may include the feature map generated by the normalization layer 1420. The output of the threshold layer 1422 may include a set of discrete values (e.g., binary, hexadecimal, or alphanumeric). The output may be of the same dimensions as the normalization layer 1420. In some embodiments, the threshold layer 1422 may compare each value in the input feature map to a threshold value. When the value is greater than or equal to threshold value, the threshold layer 1422 may assign, produce, or otherwise generate a discrete value (e.g., "1" in binary) for the value in the input feature map. Conversely, when the value is less than or equal to the threshold value, the threshold layer 1422 may assign, produce, or otherwise generate another discrete value (e.g., "0" in binary) for the input feature map. The evaluation may be performed over the set of values in the input feature map to generate an equal number of discrete values for the hash code 1406.

Figure 14E:
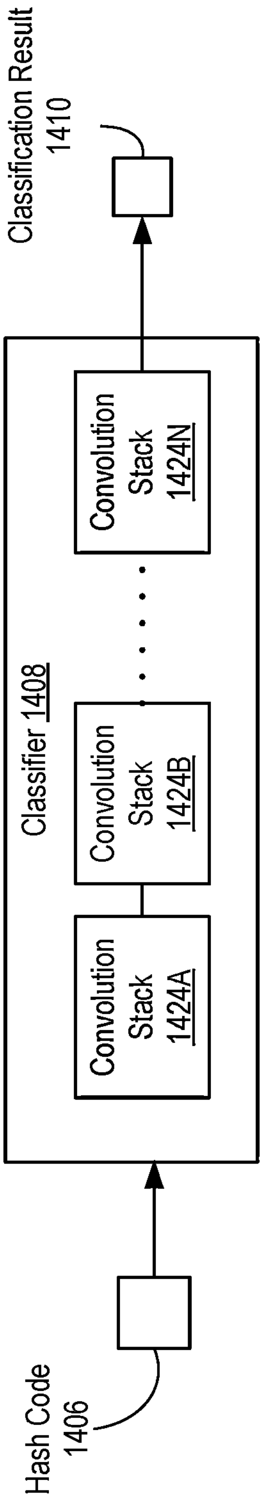
FIG. 14E depicts a block diagram of a classifier in the system for training or applying models for semantic image retrieval.

Referring now to FIG. 14E, depicted is a classifier 1408 of the image retrieval model 1216 in the system for training or applying models for semantic image retrieval. The classifier 1408 of the image retrieval model 1216 may include at least one input and at least one output. The input to the classifier 1408 can be the feature map 1414 (or corresponding feature space representations). The output can be the classification result 1410. The classifier 1408 can have a set of convolution stacks 1424A-N (hereinafter generally referred to as convolution stacks 1424).

The input and the output of the classifier 1408 may be related via the weights as defined in the set of convolution stacks 1424. The set of convolution stacks 1424 can be arranged in series (e.g., as depicted) or parallel configuration, or in any combination. In a series configuration, the input of one convolution stacks 1424 may include the output of the previous convolution stacks 1424 (e.g., as depicted). In parallel configuration, the input of one convolution stacks 1424 may include the input of the entire encoder 1404.

Figure 14F:
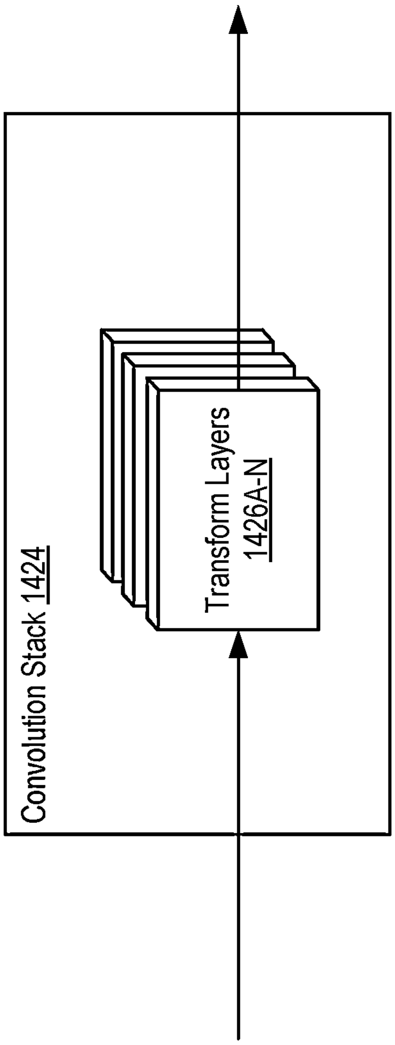
FIG. 14F depicts a block diagram of a convolution stack in a classifier of the image retrieval model in the system for training or applying models for semantic image retrieval.

Referring now to FIG. 14F, depicted is a block diagram of a convolution stack 1424 in the classifier 1408 of the image retrieval model 1216 in the system for training models or applying for semantic image retrieval. Each convolution stack 1424 in the convolution stack 1424 can have a set of transform layers 1426A-N (hereinafter generally referred to as transform layers 1426). The set of transform layers 1426 can include one or more weights to modify or otherwise process the input to produce or generate the classification result 1410. The input may include the feature map 1414 when the convolution stack 1424 is the first in the classifier 1408. The input may include the classification result 1410 from a previous convolution stack 1424 when the convolution stack 1424 is not the first in the classifier 1408. The classification result 1410 may correspond to one of the feature map 1414. The transform layers 1426 may comprise a convolutional layer, a normalization layer, and an activation layer (e.g., a rectified linear unit (ReLU)), among others. The set of transform layers 1426 can be arranged in series, with an output of one transform layer 1426 fed as an input to a succeeding transform layer 1426. Each transform layer 1426 may have a non-linear input-to-output characteristic. In some embodiments, the set of transform layers 1426 may be a convolutional neural network (CNN). For example, the convolutional layer, the normalization layer, and the activation layer (e.g., a rectified linear unit (ReLU)) may be arranged in accordance with CNN. The transform layers 1416 may define or include the weights of the corresponding convolution stack 1412.

The model trainer 1208 may determine an error metric based on the classification result 1410 and the corresponding annotation of the labeled image 1226. The error metric may indicate a degree of deviation of the classification result 1410 determined by the classifier 1408 of the image retrieval model 1216 relative to the classification indicated by the annotation of the corresponding labeled image 1226. The error metric may be calculated in accordance with any number of loss functions, such as mean squared error (MSE), a quadratic loss, and a cross-entropy loss, among others. In general, when the classification result 1410 does not match the classification identified in the annotation of the input labeled image 1226, the error metric may be increased or higher. Conversely, when the classification result 1410 matches the classification identified by the corresponding annotation, the error metric may be decreased or lowered. In some embodiments, the model trainer 1208 can determine the cross entropy for the classification error for training the threshold layer 1422. The classification error may indicate the error between the labeled images 1226 and the gradients. The gradients can be updated to guide the loss function to take steps in the right direction in a stochastic gradient descent setting. In some embodiments, the most discriminative hash codes can be learned when the gradient descent reaches the global minima of the convex optimization curve.

In accordance with the loss function, the model trainer 1208 may update one or more weights of the image retrieval model 1216. The updating of weights may be in accordance with an optimization function (or an objective function) for the image retrieval model 1216. The optimization function may define one or more rates or parameters at which the weights of the image retrieval model 1216 are to be updated. For example, the model trainer 1208 may use the optimization function with a set learning rate, a momentum, and a weight decay for a number of iterations in training. In some embodiments, the model trainer 1208 may update the one or more weights of the threshold layer 1422 using the cross entropy for the classification error in accordance with the gradient specified for the threshold layer 1422. The updating of the weights in the image retrieval model 1216 may be repeated until a convergence condition.

Figure 15:
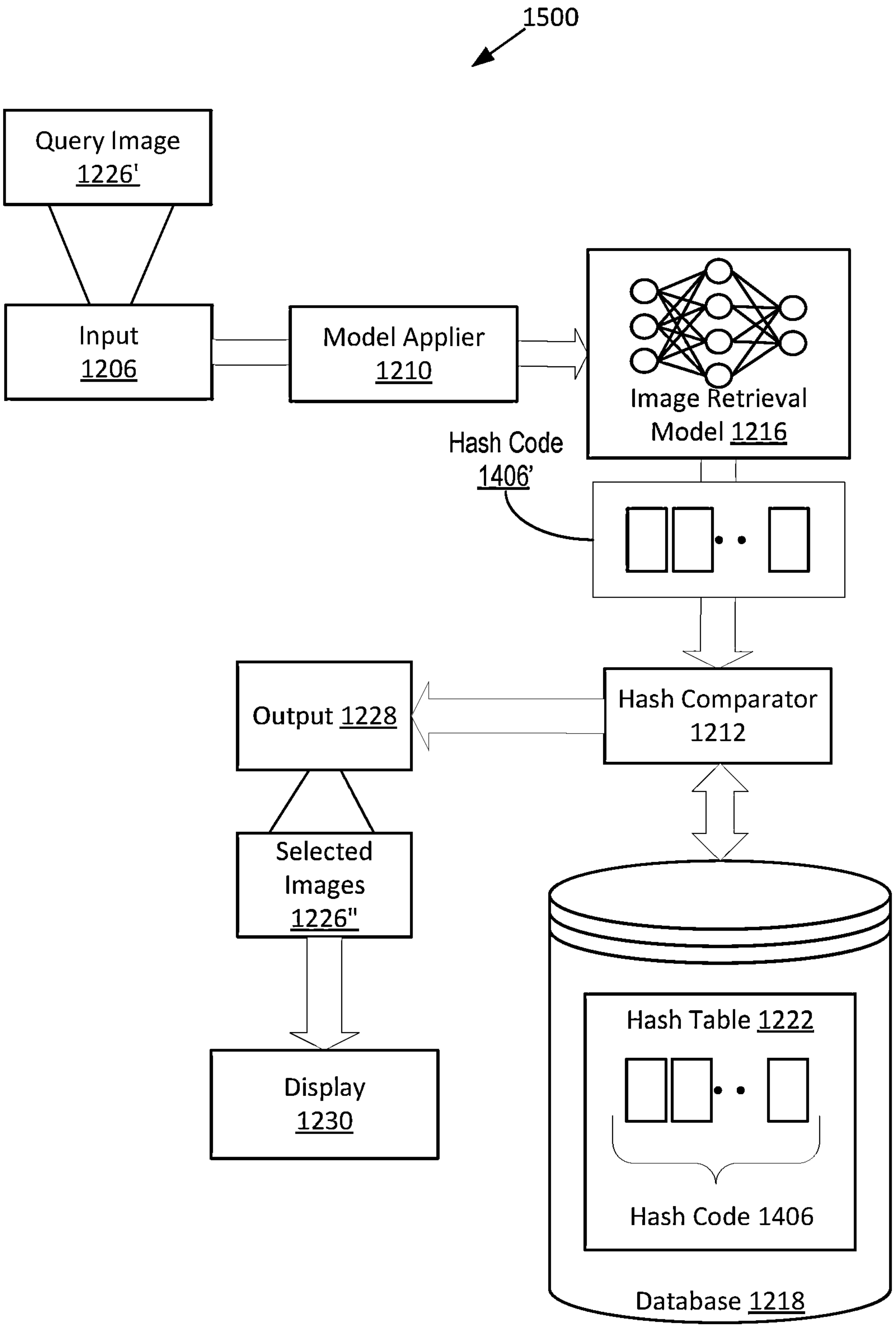
FIG. 15 depicts a block diagram of a system for applying models semantic image retrieval.

Referring now to FIG. 15, depicted is a sequence diagram of a runtime process 1000*a* block diagram of a system 1200 for semantic image retrieval. When in runtime mode, the model applier 1210 may retrieve, receive, or otherwise identify at least one query image 1226' included in at least one input 1206 from the imaging device 1204. The model applier 1210 may in turn receive the input 1206 including the input image query image 1226' from the imaging device 1204. The query image 1226' can be of a similar or same domain as the labeled image 1226. For example, both the labeled image 1226 and the query image 1226' may be whole slide images of tissue samples taken from the prostrate, pancreas, breast, or liver, among others In some embodiments, the imaging device 1204 may acquire or generate at least one query image 1208' of at least one tissue sample to send to the image retrieval system 1202. With the acquisition of the query image 1226', the imaging device 1204 may provide, send, or transmit the input 1206 including the query image 1226' to the image retrieval system 1202. However, the query image 1226' may lack any annotations that is associated with the labeled images 1226. In some embodiments, the imaging device 1204 may acquire more than one query image 1226' as a set to provide to the image retrieval system 1202 via the input 1206.

With the identification of the query image 1226', the model applier 1210 may apply the query image 1226' to the image retrieval model 1216. Under runtime, the image retrieval model 1216 may lack or may not invoke the classifier 1408. In applying, the model applier 1210 may feed the query image 1226' into the image retrieval model 1216. The model applier 1210 may also process the query image 1226' in accordance with the weights of the image retrieval model 1216 (e.g., the weights of the convolution block 1402 and the encoder 1404). From processing, the model applier 1210 may identify a hash code 1406' generated by the encoder 1404 of the image retrieval model 1216 for the query image 1226'. Based on the hash code 1406' generated from the query image 1226', the hash comparator 1212 may identify or otherwise select one or more selected images 1226" from the database 1218 to provide. The selected images 1226" from the database 1218 may correspond to at least a subset of the labeled images 1226 used to train the image retrieval model 1216. In some embodiments, the selected images 1226" may be selected from a pool of candidate images used to generate the hash codes 1406 in the hash table 1222 after training the image retrieval model 1216. In general, the images 1226" selected from the labeled images 1226 may be semantically similar to the query image 1226'.

To select, the hash comparator 1212 may compare the hash code 1406' for the query image 1226' with the hash codes 1406 on the hash table 1222 corresponding to the labeled images 1226. In some embodiments, the hash comparator 1212 may search the hash table 1222 using the hash code 1406' to identify other hash codes 1406. For each comparison, the hash comparator 1212 may calculate, determine, or generate a distance metric between the hash code 1406' for the query image 1226' and the hash code 1406 for a candidate image in the database 1218. The distance metric may include, for example, a hamming distance, a Levenshtein distance, a Jaro distance, a Euclidean distance, and L-n distance, among others. The hash comparator 1212 may compare the distance metric to a threshold metric. The threshold metric may delineate whether to select the corresponding candidate image is sufficiently similar to provide as one of the selected images 1226". When the distance metric is less than the threshold metric, the hash comparator 1212 may select and include the candidate image as one of the selected images 1226" to provide. Otherwise, when the distance metric is greater than or equal to the threshold metric, the hash comparator 1212 may exclude the candidate image from the selected images 1226" to provide.

With the selection, the hash comparator 1212 may provide the selected images 1226" via the output 1228 to the requesting device (e.g., the imaging device 1204) for presentation (e.g., via the display 1230). The hash comparator 1212 may send, transmit, or provide at least one output 1228 for presentation to the display 1230. The output 1228 may include the selected images 1226" and the query image 1226'. The display 1230 may be part of the image retrieval system 1202 or on another computing device that may be communicatively coupled to the image retrieval system 1202. The display 1230 may present or render the output 1228 upon receipt. For example, the display 1230 may render a graphical user interface that shows the selected images 1226".

Figure 16:
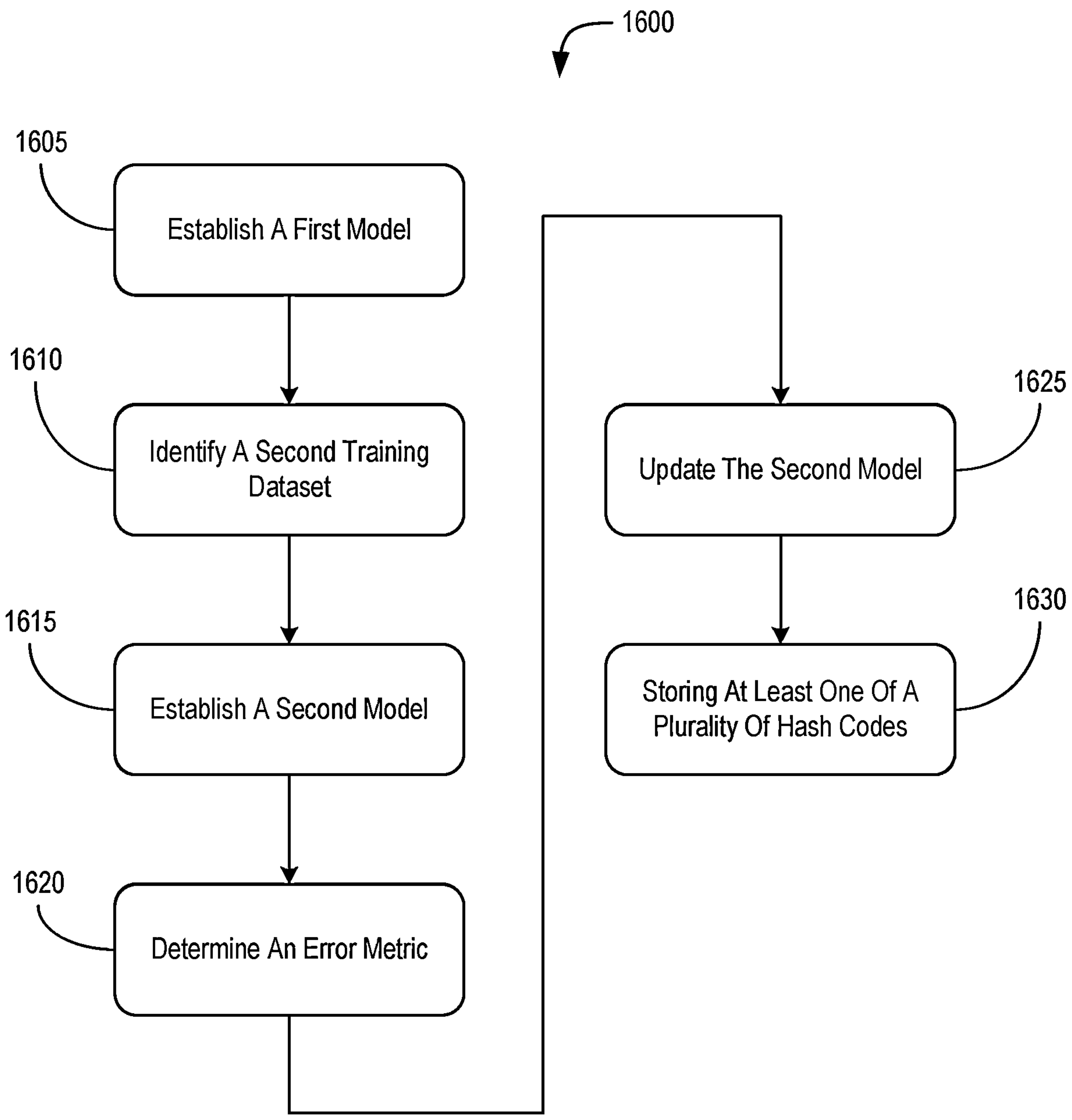
FIG. 16 depicts a flow diagram of a method of training models for semantic image retrieval.

FIG. 16 depicts a flow diagram of a method of training models for semantic image retrieval. The method 1600 may be implemented or performed by any of the components described herein in conjunction with FIGS. 12-15 or FIG. 18. In overview, a computing system (e.g., the image retrieval system 1202) may identify establish a first model (e.g., the preliminary model 1214) (1605). The computing system may identify a second training dataset (e.g., the labeled images 1226) (1610). The computing system may apply a second model (e.g., the image retrieval model 1216) (1615). The computing system may determine an error metric (e.g., error metric based on the classification results 1410 of the image retrieval model 1216) (1620). The computing system may update the second model (e.g., weights of the image retrieval model 1216 (1625). The computing system may store at least one of a plurality of hash codes (e.g. the hash codes 1406) (1630).

Figure 17:
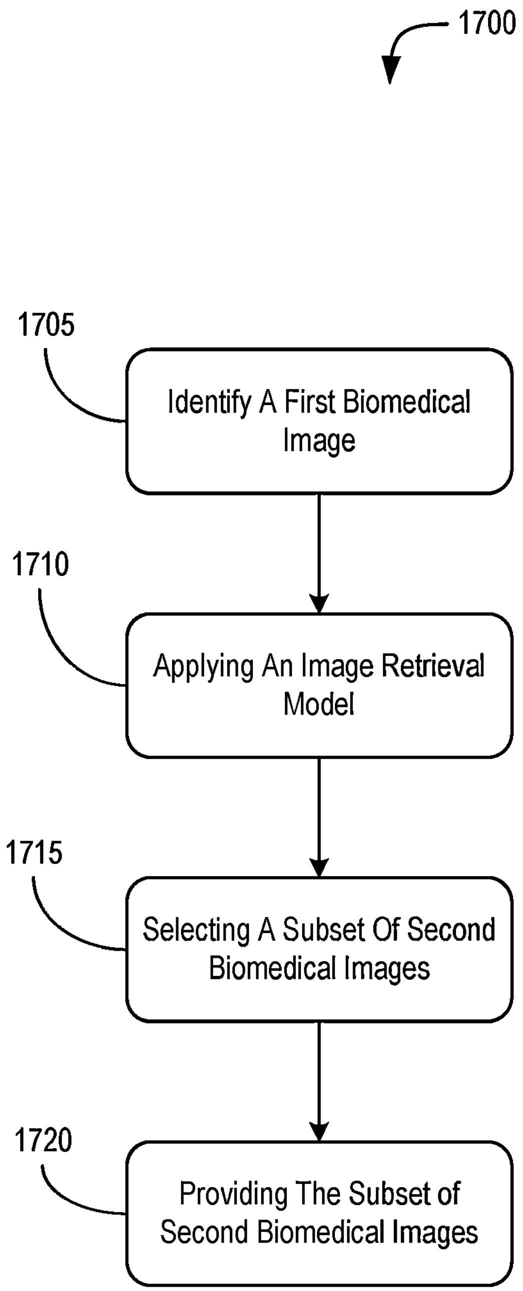
FIG. 17 depicts a flow diagram of a method of applying models for semantic image retrieval.

FIG. 17 depicts a flow diagram of a method of semantic image retrieval. The method 1700 may be implemented or performed by any of the components described herein in conjunction with FIGS. 12-15 or FIG. 18. In overview, a computing system (e.g., the image retrieval system 1202) may identify a first biomedical image (e.g., the query image 1226') (1705). The computing system may apply an image retrieval model (e.g., the image retrieval model 1216) to the image (e.g., the query image 1226') (1710). The computing system may select a subset of second biomedical images (e.g., the labeled images 1226A-N) (1715). The computing system may provide the subset of second biomedical images (e.g. selected images 1226'') (1720).

C. COMPUTING AND NETWORK ENVIRONMENT

Figure 18:
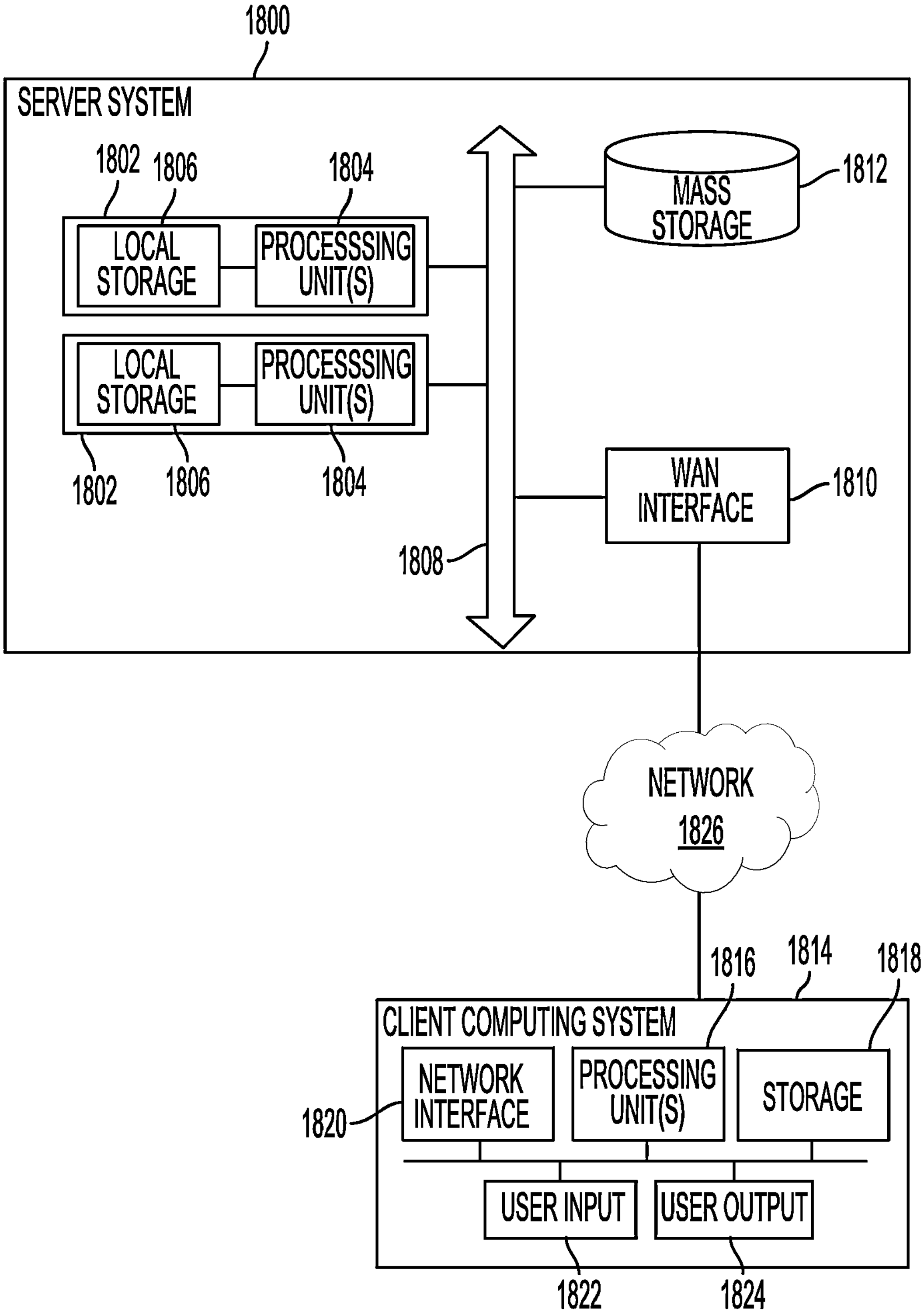
FIG. 18 depicts a block diagram of a server system and a client computer system in accordance with an illustrative embodiment.

Various operations described herein can be implemented on computer systems. FIG. 18 shows a simplified block diagram of a representative server system 1800, client computer system 1814, and network 1826 usable to implement certain embodiments of the present disclosure. In various embodiments, server system 1800 or similar systems can implement services or servers described herein or portions thereof. Client computer system 1814 or similar systems can implement clients described herein. The system 100 described herein can be similar to the server system 1800. Server system 1800 can have a modular design that incorporates a number of modules 1802 (e.g., blades in a blade server embodiment); while two modules 1802 are shown, any number can be provided. Each module 1802 can include processing unit(s) 1804 and local storage 1806.

Processing unit(s) 1804 can include a single processor, which can have one or more cores, or multiple processors. In some embodiments, processing unit(s) 1804 can include a general-purpose primary processor as well as one or more special-purpose co-processors such as graphics processors, digital signal processors, or the like. In some embodiments, some or all processing units 1804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1804 can execute instructions stored in local storage 1806. Any type of processors in any combination can be included in processing unit(s) 1804.

Local storage 1806 can include volatile storage media (e.g., DRAM, SRAM, SDRAM, or the like) and/or non-volatile storage media (e.g., magnetic or optical disk, flash memory, or the like). Storage media incorporated in local storage 1806 can be fixed, removable or upgradeable as desired. Local storage 1806 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1804 need at runtime. The ROM can store static data and instructions that are needed by processing unit(s) 1804. The permanent storage device can be a non-volatile read-and-write memory device that can store instructions and data even when module 1802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1806 can store one or more software programs to be executed by processing unit(s) 1804, such as an operating system and/or programs implementing various server functions such as functions of the system 100 of FIG. 1 or any other system described herein, or any other server(s) associated with system 100 or any other system described herein.

"Software" refers generally to sequences of instructions that, when executed by processing unit(s) 1804 cause server system 1800 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1804. Software can be implemented as a single program or a collection of separate programs or program modules that interact as desired. From local storage 1806 (or non-local storage described below), processing unit(s) 1804 can retrieve program instructions to execute and data to process in order to execute various operations described above.

In some server systems 1800, multiple modules 1802 can be interconnected via a bus or other interconnect 1808, forming a local area network that supports communication between modules 1802 and other components of server system 1800. Interconnect 1808 can be implemented using various technologies including server racks, hubs, routers, etc.

A wide area network (WAN) interface 1810 can provide data communication capability between the local area network (interconnect 1808) and the network 1826, such as the Internet. Technologies can be used, including wired (e.g., Ethernet, IEEE 1302.3 standards) and/or wireless technologies (e.g., Wi-Fi, IEEE 1302.11 standards).

In some embodiments, local storage 1806 is intended to provide working memory for processing unit(s) 1804, providing fast access to programs and/or data to be processed while reducing traffic on interconnect 1808. Storage for larger quantities of data can be provided on the local area network by one or more mass storage subsystems 1812 that can be connected to interconnect 1808. Mass storage subsystem 1812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1812. In some embodiments, additional data storage resources may be accessible via WAN interface 1810 (potentially with increased latency).

Server system 1800 can operate in response to requests received via WAN interface 1810. For example, one of modules 1802 can implement a supervisory function and assign discrete tasks to other modules 1802 in response to received requests. Work allocation techniques can be used. As requests are processed, results can be returned to the requester via WAN interface 1810. Such operation can generally be automated. Further, in some embodiments, WAN interface 1810 can connect multiple server systems 1800 to each other, providing scalable systems capable of managing high volumes of activity. Other techniques for managing server systems and server farms (collections of server systems that cooperate) can be used, including dynamic resource allocation and reallocation.

Server system 1800 can interact with various user-owned or user-operated devices via a wide-area network such as the Internet. An example of a user-operated device is shown in FIG. 13 as client computing system 1814. Client computing system 1814 can be implemented, for example, as a consumer device such as a smartphone, other mobile phone, tablet computer, wearable computing device (e.g., smart watch, eyeglasses), desktop computer, laptop computer, and so on.

For example, client computing system 1814 can communicate via WAN interface 1810. Client computing system 1814 can include computer components such as processing unit(s) 1816, storage device 1818, network interface 1820, user input device 1822, and user output device 1824. Client computing system 1814 can be a computing device implemented in a variety of form factors, such as a desktop computer, laptop computer, tablet computer, smartphone, other mobile computing device, wearable computing device, or the like.

Processor 1816 and storage device 1818 can be similar to processing unit(s) 1804 and local storage 1806 described above. Suitable devices can be selected based on the demands to be placed on client computing system 1814; for example, client computing system 1814 can be implemented as a "thin" client with limited processing capability or as a high-powered computing device. Client computing system 1814 can be provisioned with program code executable by processing unit(s) 1816 to enable various interactions with server system 1800.

Network interface 1820 can provide a connection to the network 1826, such as a wide area network (e.g., the Internet) to which WAN interface 1810 of server system 1800 is also connected. In various embodiments, network interface 1820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1822 can include any device (or devices) via which a user can provide signals to client computing system 1814; client computing system 1814 can interpret the signals as indicative of particular user requests or information. In various embodiments, user input device 1822 can include any or all of a keyboard, touch pad, touch screen, mouse or other pointing device, scroll wheel, click wheel, dial, button, switch, keypad, microphone, and so on.

User output device 1824 can include any device via which client computing system 1814 can provide information to a user. For example, user output device 1824 can include a display to display images generated by or delivered to client computing system 1814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that functions as both input and output device. In some embodiments, other user output devices 1824 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1804 and 1816 can provide various functionality for server system 1800 and client computing system 1814, including any of the functionality described herein as being performed by a server or client, or other functionality.

It will be appreciated that server system 1800 and client computing system 1814 are illustrative and that variations and modifications are possible. Computer systems used in connection with embodiments of the present disclosure can have other capabilities not specifically described here. Further, while server system 1800 and client computing system 1814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method, comprising:

identifying, by a computing system, a first biomedical image for use in retrieving at least one of a plurality of second biomedical images;

applying, by the computing system, a convolutional image retrieval model to the first biomedical image, the convolutional image retrieval model comprising:

a convolutional neural network including a convolution block having a first plurality of kernel parameters, the convolutional neural network configured to generate a feature map using the first biomedical image, the first plurality of kernel parameters transferred from a preliminary model, wherein the preliminary model comprises a generative adversarial network including a discriminator, wherein the first plurality of kernel parameters are derived from the discriminator and transferred from the preliminary model to the convolution block, the discriminator having been trained on unlabeled images, the preliminary model being a separate model from the convolutional image retrieval model; and an encoder having a second plurality of kernel parameters to generate a first hash code for the first biomedical image based on the feature map;

selecting, by the computing system, from the plurality of second biomedical images corresponding to a plurality of second hash codes, a subset of second biomedical images using the first hash code for the first biomedical image; and providing, by the computing system, the subset of second biomedical images identified using the first biomedical image.

2. The method of claim 1, wherein selecting the subset of second biomedical images further comprises:

generating a distance metric between the first hash code and a corresponding second hash code of the plurality of second hash codes for a corresponding second biomedical image of the plurality of second biomedical images;

determining that the distance metric between the first hash code and corresponding second hash code is within a threshold metric; and including, in response to determining that the distance metric is within the threshold metric, the second biomedical image corresponding to the second hash code in the subset of second biomedical images.

3. The method of claim 1, wherein the encoder of the convolutional image retrieval model further comprises a threshold layer having at least a subset of the second plurality of kernel parameters to generate a first discrete value for the first hash code when an input value to the threshold layer satisfies a threshold and generate a second discrete value for the first hash code when the input value to the threshold layer does not satisfy the threshold.

4. The method of claim 1, wherein each hash code of the plurality of second hash codes has a set of values defining one or more features of a corresponding labeled image, the set of values of the plurality of second hash codes corresponding to at least one of a color, a texture, an object type, or semantic information.

5. The method of claim 1, wherein the convolution block of the convolutional image retrieval model comprises the first plurality of kernel parameters transferred from the preliminary model, the preliminary model established using a training dataset having a plurality of unlabeled images different from a plurality of labeled images used to establish the convolutional image retrieval model.

6. The method of claim 1, wherein the convolutional image retrieval model lacks a classifier used to update at least one of the first plurality of kernel parameters of the convolution block and the second plurality of kernel parameters of the encoder based on a comparison between a classification for a sample biomedical image generated by the classifier and a labeled classifier for the sample biomedical image as identified in a training dataset.

7. The method of claim 1, wherein identifying the first biomedical image further comprises receiving the first biomedical image derived from a tissue sample via a histopathological image preparer.

8. The method of claim 1, wherein the transferred kernel parameters cause the convolutional neural network to generate the feature map based on features learned by the discriminator from unlabeled biomedical images, the feature map being used to generate the first hash code for image retrieval.

9. A system, comprising:

a computing system having one or more processors coupled with memory, configured to:

identify a first biomedical image for use in retrieving at least one of a plurality of second biomedical images;

apply a convolutional image retrieval model to the first biomedical image, the convolutional image retrieval model comprising:

a convolutional neural network including a convolution block having a first plurality of kernel parameters, the convolutional neural network configured to generate a feature map using the first biomedical image, the first plurality of kernel parameters transferred from a preliminary model, wherein the preliminary model comprises a generative adversarial network including a discriminator, wherein the first plurality of kernel parameters are derived from the discriminator and transferred from the preliminary model to the convolution block, the discriminator having been trained on unlabeled images, the preliminary model being a separate model from the convolutional image retrieval model; and an encoder having a second plurality of kernel parameters to generate a first hash code for the first biomedical image based on the feature map;

identify, from the plurality of second biomedical images corresponding to a plurality of second hash codes, a subset of second biomedical images using the first hash code for the first biomedical image; and provide the subset of second biomedical images identified using the first biomedical image.

10. The system of claim 9, wherein the computing system is further configured to:

generate a distance metric between the first hash code and a corresponding second hash code of the plurality of second hash codes for a corresponding second biomedical image of the plurality of second biomedical images;

determine that the distance metric between the first hash code and corresponding second hash code is within a threshold metric; and include, in response to determining that the distance metric is within the threshold metric, the second biomedical image corresponding to the second hash code in the subset of second biomedical images.

11. The system of claim 9, wherein the encoder of the convolutional image retrieval model further comprises a threshold layer having at least a subset of the second plurality of kernel parameters to generate a first discrete value for the first hash code when an input value to the threshold layer satisfies a threshold and generate a second discrete value for the first hash code when the input value to the threshold layer does not satisfy the threshold.

12. The system of claim 9, wherein each hash code of the plurality of second hash codes has a set of values defining one or more features of a corresponding labeled image, the set of values of the plurality of second hash codes corresponding to at least one of a color, a texture, an object type, or semantic information.

13. The system of claim 9, wherein the convolution block of the convolutional image retrieval model comprises the first plurality of kernel parameters transferred from the preliminary model, the preliminary model established using a training dataset having a plurality of unlabeled images different from a plurality of labeled images used to establish the convolutional image retrieval model.

14. The system of claim 9, wherein the computing system is further configured to receive the first biomedical image derived from a tissue sample via a histopathological image preparer.

15. A non-transitory computer readable medium configured to store processor-readable instructions, wherein when executed by a processor, the instructions perform operations comprising:

identifying, by a computing system, a first biomedical image with which to find for use in retrieving at least one of a plurality of second biomedical images;

applying, by the computing system, a convolutional image retrieval model to the first biomedical image, the convolutional image retrieval model comprising:

a convolutional neural network including a convolution block having a first plurality of kernel parameters, the convolutional neural network configured to generate a feature map using the first biomedical image, the first plurality of kernel parameters transferred from a preliminary model, wherein the preliminary model comprises a generative adversarial network including a discriminator, wherein the first plurality of kernel parameters are derived from the discriminator and transferred from the preliminary model to the convolution block, the discriminator having been trained on unlabeled images, the preliminary model being a separate model from the convolutional image retrieval model; and an encoder having a second plurality of kernel parameters to generate a first hash code for the first biomedical image based on the feature map;

selecting, by the computing system, from the plurality of second biomedical images corresponding to a plurality of second hash codes, a subset of second biomedical images using the first hash code for the first biomedical image; and providing, by the computing system, the subset of second biomedical images identified using the first biomedical image.

16. The non-transitory computer readable medium of claim 15, wherein selecting the subset of second biomedical images further comprises:

generating a distance metric between the first hash code and a corresponding second hash code of the plurality of second hash codes for a corresponding second biomedical image of the plurality of second biomedical images;

determining that the distance metric between the first hash code and corresponding second hash code is within a threshold metric; and including, in response to determining that the distance metric is within the threshold metric, the second biomedical image corresponding to the second hash code in the subset of second biomedical images.

17. The non-transitory computer readable medium of claim 15, wherein the encoder of the convolutional image retrieval model further comprises a threshold layer having at least a subset of the second plurality of kernel parameters to generate a first discrete value for the first hash code when an input value to the threshold layer satisfies a threshold and generate a second discrete value for the first hash code when the input value to the threshold layer does not satisfy the threshold.

18. The non-transitory computer readable medium of claim 15, wherein each hash code of the plurality of second hash codes has a set of values defining one or more features of a corresponding labeled image, the set of values of the plurality of second hash codes corresponding to at least one of a color, a texture, an object type, or semantic information.

19. The non-transitory computer readable medium of claim 15, wherein the convolution block of the convolutional image retrieval model comprises the first plurality of kernel parameters transferred from the preliminary model, the preliminary model established using a training dataset having a plurality of unlabeled images different from a plurality of labeled images used to establish the convolutional image retrieval model.

20. The non-transitory computer readable medium of claim 15, wherein the convolutional image retrieval model lacks a classifier used to update at least one of the first plurality of kernel parameters of the convolution block and the second plurality of kernel parameters of the encoder based on a comparison between a classification for a sample biomedical image generated by the classifier and a labeled classifier for the sample biomedical image as identified in a training dataset.

* * * * *